United States Patent
Lam et al.

(10) Patent No.: US 11,255,946 B2
(45) Date of Patent: Feb. 22, 2022

(54) APPARATUS AND METHOD FOR ZONE-BASED POSITIONING

(71) Applicant: Trustees of Boston University, Boston, MA (US)

(72) Inventors: Emily W. Lam, Cambridge, MA (US); Thomas D. C. Little, Newton, MA (US)

(73) Assignee: TRUSTEEES OF BOSTON UNIVERSITY, Boston, MA (US)

(*) Notice: Subject to any disclaimer, the term of this patent is extended or adjusted under 35 U.S.C. 154(b) by 0 days.

(21) Appl. No.: 17/225,250

(22) Filed: Apr. 8, 2021

(65) Prior Publication Data
US 2021/0318409 A1  Oct. 14, 2021

Related U.S. Application Data

(60) Provisional application No. 63/007,629, filed on Apr. 9, 2020.

(51) Int. Cl.
*H04B 10/00* (2013.01)
*G01S 5/16* (2006.01)
(Continued)

(52) U.S. Cl.
CPC .............. *G01S 5/16* (2013.01); *G01S 1/7032* (2019.08); *H04B 10/1123* (2013.01); *H04B 10/676* (2013.01)

(58) Field of Classification Search
CPC . H04B 10/116; H04B 10/112; H04B 10/1123; H04B 10/114; H04B 10/1143;
(Continued)

(56) References Cited

U.S. PATENT DOCUMENTS

2013/0314381 A1   11/2013   Altman et al.
2014/0198206 A1   7/2014    Murray
(Continued)

OTHER PUBLICATIONS

Abdalla, Iman et al. "Dynamic FOV visible light communications receiver for dense optical networks." IET Journals. The Institution of Engineering and Technology. 10.1049/iet-com.2018.5784. www.ietdl.org, 2018.
(Continued)

*Primary Examiner* — Hanh Phan
(74) *Attorney, Agent, or Firm* — Burns & Levinson LLP; Steven M. Mills

(57) ABSTRACT

An apparatus, and method of operating the same, include a system for indoor positioning and localization. The apparatus includes a first beacon having a beacon optical detector to receive an optical signal, and a beacon microcontroller. The apparatus includes a zone-positioning unit (ZPU) having an optical source configured to transmit the optical signal, and a ZPU microcontroller. The beacon microcontroller is configured to identify and decode the optical signal after receipt by the beacon optical detector to determine data related to a position of the ZPU. The beacon microcontroller is further configured to wirelessly communicate with the ZPU microcontroller to convey information to the ZPU including the data related to a position of the ZPU and a known position of the first beacon. The ZPU microcontroller is configured to determine a position of the ZPU based on the information received from the first beacon.

20 Claims, 17 Drawing Sheets

(51) Int. Cl.
  G01S 1/70 (2006.01)
  H04B 10/67 (2013.01)
  H04B 10/112 (2013.01)
(58) Field of Classification Search
  CPC ....... H04B 10/1149; H04B 10/40; G01S 1/70;
   G01S 5/16; H04W 4/04
  USPC ....... 398/172, 118, 119, 127, 128, 130, 129,
   398/131, 135, 136, 158, 159, 115, 169,
   398/170; 356/614, 4.01
  See application file for complete search history.

(56) References Cited

U.S. PATENT DOCUMENTS

| | | | |
|---|---|---|---|
| 2015/0373503 A1* | 12/2015 | Jovicic | G01S 5/0252 |
| | | | 455/456.1 |
| 2016/0072581 A1* | 3/2016 | Ikehara | G01S 1/042 |
| | | | 398/118 |
| 2016/0131761 A1 | 5/2016 | Yates et al. | |
| 2017/0205230 A1 | 7/2017 | Send et al. | |
| 2018/0249306 A1 | 8/2018 | Pandharipande | |

OTHER PUBLICATIONS

Adafruit HUZZAH32—ESP32 Feather Board. https://www.adafruit.com/product/3405. Accessed Mar. 15, 2021.
Ahmed, Arafa et al. "Angle-of-arrival reception for optical wireless location technology." vol. 23, No. 6, Mar. 23, 2015. Optics Express 7775.10.1364/OE.23.007755.
Cincotta, Stefanie et al. "Indoor Visible Light Positioning: Overcoming the Practical Limitations of the Quadrant Angular Diversity Aperture Receiver (QADA) by Using the Two-Stage QADA-Plus Receiver." Sensors 2019, 19, 956.10.3390/s19040956, 2019.
Fahs, Bassem et al. "A Gbps Building-to-Building VLC Link Using Standard CMOS Avalanche Photodiodes." IEEE Photonics Journal, vol. 9, No. 6, Dec. 2017. 10.1109/JPHOT.2017.2765499.
Garmin, Lidar Lite v3 Operation Manual and Technical Specifications, 2016.
Gebre-Egziabher, D. et al. "Design and Performance Analysis of a Low-Cost Aided Dead Reckoning Navigation System." Department of Aeronautics and Astronautics, Stanford University, 2016.
Kahn, Joseph M et al. "Wireless Infrared Communications." Proceedings of the IEEE, vol. 85, No. 2. Feb. 1997. Downloaded Mar. 15, 2021 at 18:29:15 UTC from IEEE Xplore, 1999.
Kassner, Moritz et al. "Pupil: An Open Source Platform for Pervasive Eye Tracking and Mobile Gaze-based Interaction." Ubicomp '14 Adjunct, Sep. 13-17, 2014. Seattle, WA, USA. 10.1145/2638728.2641695.
Lam, E. W. et al. "Angle Diversity to Increase Coverage and Position Accuracy in 3D Visible Light Positioning." 978-1-5386-8088-9/19, © 2019 IEEE. Downloaded on Mar. 15, 2021 at 18:27:29 UTC from IEEE Xplore.
Lam, E. W. et al. "Indoor 3D Localization with Low-Cost LiFi Components." Downloaded on Mar. 15, 2021 at 18:26:59 UTC from IEEE Xplore.
Lam, E. W. et al. "Resolving Height Uncertainty in Indoor Visible Light Positioning Using a Steerable Laser." 978-1-5386-4328-0/18, © 2018 IEEE. Downloaded on Mar. 15, 2021 at 18:26:59 UTC from IEEE Xplore.
Lam, E. W. et al. "Zone-Based Positioning Using Trust Beacons, Angle Diversity, and Optical Wireless Communications." 978-1-7281-7440-2/20, © 2020 IEEE. Downloaded on Mar. 15, 2021 at 18:28:04 UTC from IEEE Xplore.
Li, Qing-Lin, et al. "Three-dimensional indoor visible light positioning system with a single transmitter and a single tilted receiver." Opt. Eng. 55(10),106103 (2016). 10.1117/1.OE.55.10.106103.
Lymberopoulos, Dimitrios et al. "The Microsoft Indoor Localization Competition." IEEE Signal Processing Magazine, Sep. 2017. 10.1109/MSP.2017.2713817. Downloaded on Mar. 15, 2021 at 18:11:44 UTC from IEEE Xplore.
Milanović, Veljko et al. "Fast and High-Precision 3D Tracking and Position Measurement with MEMS Micromirrors." 978-1-4244-1918-0/08, © 2008 IEEE. Downloaded on Mar. 15, 2021 at 18:28:31 UTC from IEEE Xplore.
Mirrorcle Products List. Mirrorcle Technologies, Inc. https_www.mirrorcletech.com_pdf_Mirrorcle_Products_List, 2021.
Optitrack—Prime 13—Technical Specifications, https://optitrack.com/cameras/prime-13/specs.html. Downloaded Mar. 15, 2021, 2:34PM.
Pratama, Azkario Rizky et al. "Smartphone-based Pedestrian Dead Reckoning as an Indoor Positioning System." 978-1-4673-2376-5/12 © 2012 IEEE. International Conference on System Engineering and Technology Sep. 11-12, 2012. Bandung, Indonesia. Downloaded on Mar. 15, 2021 at 18:13:48 UTC from IEEE Xplore.
Rahaim, Michael B. et al. "Beam control for indoor FSO and dynamic dual-use VLC lighting systems." Journal of Communications and Information Networks, vol. 2, No. 4, Dec. 2017. 10.1007/s41650-017-0041-7.
Sharp, Ian et al. "Sensor based dead reckoning for indoor positioning." Physical Communication 13 (2014) 4-16. 10.1016/j.phycom.2013.11.013. www.elsevier.com/locate/phycom.
Steendam, Heidi et al. "Theoretical Lower Bound for Indoor Visible Light Positioning Using Received Signal Strength Measurements and an Aperture-Based Receiver." Journal of Lightwave Technology, vol. 35, No. 2, Jan. 15, 2017. Downloaded on Mar. 15, 2021 at 18:19:27 UTC from IEEE Xplore.
Tanigawa, Makoto, et al. "Augmentation of Low-cost GPS/MEMS INS with UWB Positioning System for Seamless Outdoor/Indoor Positioning.", 2006.
Thorlabs—PDA36A Si Switchable Gain Detector, 350-1100nm, 10 MHz BW, 13mm, 8-32 Taps. https://www.thorlabs.com/thorProduct.cfm?partNumber=PDA36A, 2021.
TTL Laser Diode—5mW 650nm Red—50KHz Max. https://www.adafruit.com/product/1056. Downloaded Mar. 15, 2021, 2:31PM.
Wearables by Bose—Round Bluetooth Audio Sunglasses, https://www.bose.com/en_us/products/frames/bose-frames-rondo.html#v=bose_frames_rondo_black_us. Downloaded Mar. 15, 2021, 2:33PM.
Xiao, Yao et al. "Online IMU Self-Calibration for Visual-Inertial Systems." Sensors 2019, 19, 1624. www.mdpi.com/journal/sensors. 10.3390/s19071624.
Yang, Se-Hoon et al. "Three-Dimensional Visible Light Indoor Localization Using AOA and RSS With Multiple Optical Receivers." Journal of Lightwave Technology, vol. 32, No. 14, Jul. 15, 2014. 10.1109/JLT.2014.2327623. Downloaded on Mar. 15, 2021 at 18:26:06 UTC from IEEE Xplore.
Zafar, Fahad et al. "Laser-Diode-Based Visible Light Communication: Toward Gigabit Class Communication." IEEE Communications Magazine, Feb. 2017. 10.1109/MCOM.2017.1500672CM. Downloaded on Mar. 15, 2021 at 18:33:26 UTC from IEEE Xplore.
Zhuang, Yuan et al. "A Survey of Positioning Systems Using Visible LED Lights." IEEE Communications Surveys & Tutorials, vol. 20, No. 3, Third Quarter 2018 10 1109/COMST.2018.2806558.
International Search Report dated Jul. 16, 2021 for International Application No. PCT/US21/26327 (16 pgs.).

* cited by examiner

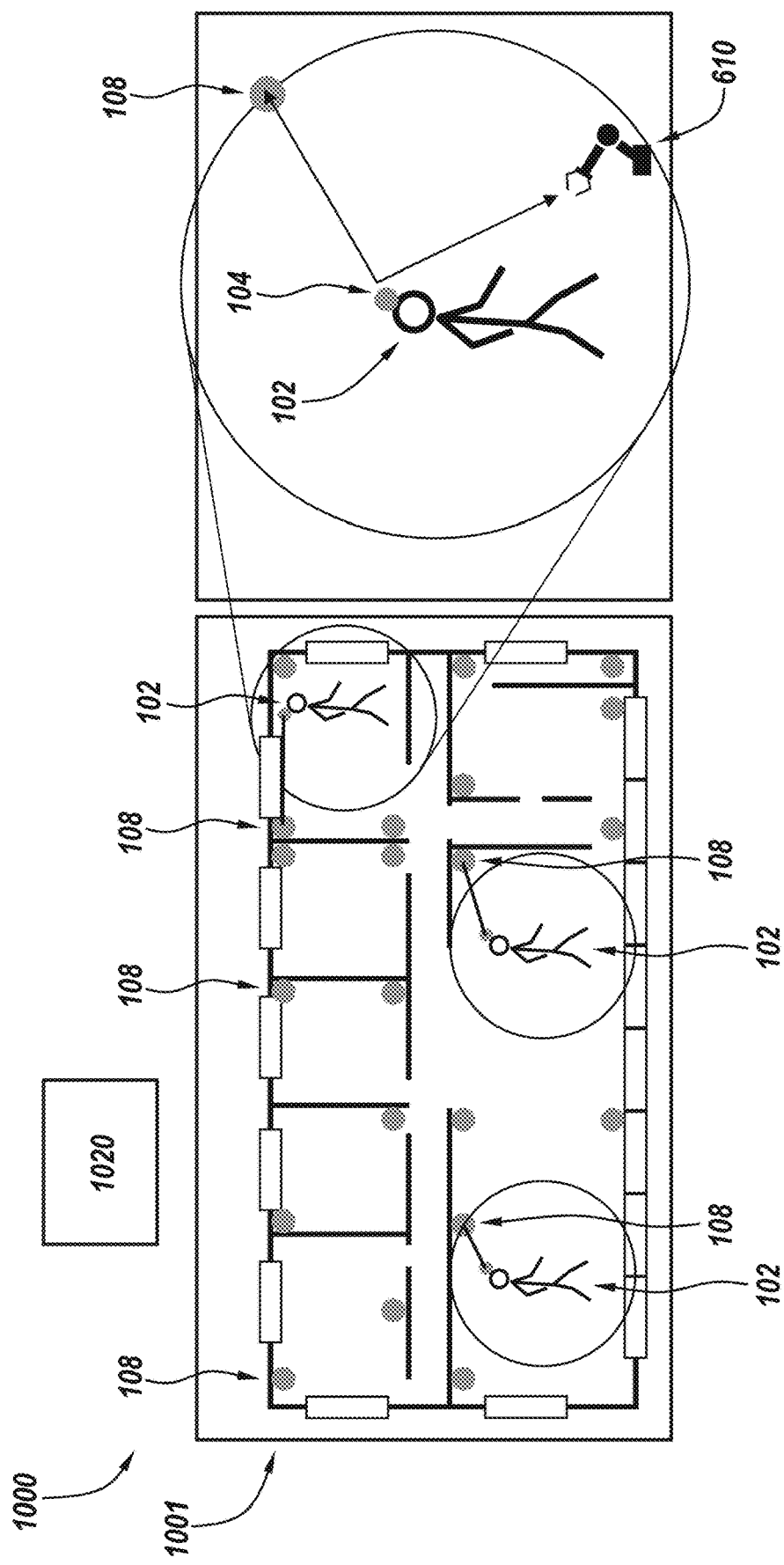

| Parameter | Baseline | with MEMS | Experimental |
|---|---|---|---|
| $TB_1$ | (0, 0, Z)m | (0, 0, Z)m | (0, 0, Z)m |
| $TB_2$ | (C, 0, Z)m | (C, 0, Z)m | (C, 0, Z)m |
| $\phi_n$ | 0.5° | 0.5° | ~0.5° |
| $\theta_n$ | 0.5° | 0.01° | ~0.5° |
| $\epsilon_R$ | 0.025m | 0.025m | 0.025m |
| $H$ | 1.654m | 1.654m | 1.654m |
| $X$ | [1:0.1:2] | [1:0.1:2] | [1:0.1:2] |
| $Y$ | [1:0.1:2] | [1:0.1:2] | [1:0.1:2] |

Fig. 12

APPARATUS AND METHOD FOR ZONE-BASED POSITIONING

CROSS REFERENCE TO RELATED APPLICATIONS

This application claims priority to and the benefit of U.S. Provisional Patent Application No. 63/007,629, filed on Apr. 9, 2020 and titled, "ZONE-BASED POSITIONING SYSTEM", the contents of which are incorporated herein by reference in its entirety.

FIELD OF THE TECHNOLOGY

The subject disclosure relates generally to indoor positioning and localization, including positioning of objects, people, and devices.

BACKGROUND OF TECHNOLOGY

The ability to measure absolute or relative position is an essential component for applications involving any human or robotic interaction with the physical world. Positioning most clearly relates to vehicular navigation (outdoors) but also includes indoor navigation, and object localization and positioning for applications such as workplace automation and manufacturing. Positioning includes identifying the position of an object as well as sustaining the object's position (tracking) when the object is in motion within a frame of reference. Outdoors, positioning is commonly realized by the adoption of Global Navigation Satellite System (GLASS); the use of cellular anchors, and inertial measurement units (IMUS). However, indoor solutions for providing positioning and localization are less mature, being faced with challenges due to limited coverage, inconsistent accuracy, the isolation of individual technical approaches, and many disparate application contexts. Indoor environments are neither homogeneous in space nor in use-case and is thus difficult to cover with a single positioning technology. Moreover, a contemporary tracked object or mobile device can have many variants and can span changing spatial frames of reference, complicating the ability to provide a continuous positioning function across space and time.

Angle diversity positioning schemes, such as angle-of-arrival (AOA) schemes, and time synchronized positioning systems have shown to date the best results for indoor positioning regardless of medium. Systems that use timing-based schemes, such as time-of-flight (TOF) or time-of-difference-of arrival (TDOA), can be very accurate, but the need for time synchronization makes them more difficult to implement across a large number of devices and spaces. Commercial ultra-wideband and motion capture camera systems provide great accuracy at the expense of system-level cost and complexity, and gross knowledge of position. Light-based positioning is inherently directional and works well with AOA approaches.

Concurrently, the future of mobile devices is changing: the Cisco VNI Mobile Forecast and Trends estimates that by 2022, there will be 1.1 billion wearable devices globally. Fueled by "5G" and "edge" communications, an emerging market within personal wearable technology includes head-mounted devices for augmented and virtual reality (AR/VR), audio listening, and video recording. These include commercial entities such as Microsoft HoloLens (AR), Bose Frames (audio), Snap Spectacles (camera), and others.

Described herein are systems and methods of improved positioning systems which can be implemented within or associated mobile devices.

SUMMARY OF THE TECHNOLOGY

The application, in various implementations, addresses deficiencies associated with indoor positioning and localization. Disclosed herein is a novel personal zone-based positioning system that localizes a user via a user device, anchored by an optical wireless communications link between the user device and a beacon.

An example zone-based positioning system includes a first beacon placed at a known position within an environment at a given time. The first beacon includes a beacon optical detector configured to receive an optical signal. The first beacon includes a beacon microcontroller. The beacon microcontroller is capable of wireless communication. The beacon microcontroller is also configured to demodulate the optical signal from the optical detector. The zone-based positioning system includes a zone positioning unit (ZPU). The ZPU is either the positioned user device or a module attached to the positioned user device. In both cases, positioning the ZPU would position the user device. The ZPU includes an optical source configured to transmit the optical signal and use optical communication to communicate with the first beacon via the beacon optical detector. The ZPU includes a ZPU microcontroller capable of wireless communication. The ZPU microcontroller is configured to modulate the optical source.

The beacon microcontroller is configured to identify and decode the optical signal after receipt by the beacon optical detector to determine data related to a position of the ZPU. The data includes an orientation of the ZPU. The beacon microcontroller is further configured to wirelessly communicate with the ZPU microcontroller to convey information to the ZPU including the data related to a position of the ZPU and the known position of the first beacon. The ZPU microcontroller is configured to determine a position of the ZPU based on the information received from the first beacon.

The ZPU may include a steerable system to direct the optical source to scan the environment for the first beacon as an optical target. The steerable system may include one or more of the following: micro-electromechanical system (MEMS), electro-optical system, holographic system, or plasmonics system. The ZPU may include a gaze-tracking system, the gaze-tracking system configured to track an eye position of a user and direct the optical source based on the eye position of the user. The ZPU may include an inertial measurement unit to measure an orientation of the ZPU.

The ZPU may include a range sensor configured to measure a range from the ZPU to one or more of the following: the first beacon; a second beacon; another device; or an object. The range sensor may include one or more of the following: light and radio frequency ranging via radio signal strength, ultra-wideband signals, millimeter wave, radio frequency, RADAR, time of flight, rotating laser, images, or LIDAR.

The zone-based positioning system may include an object, defined as without active components, positioned within the environment, and the ZPU may be configured to transmit the optical signal to the object to determine an orientation of the ZPU relative the object. The ZPU may be further configured to measure the range between the ZPU and the object. The ZPU may be configured to determine a position of the object based on the orientation of the ZPU and the range between the ZPU and the object.

The zone-based positioning system may include a transitive device, defined as with active components, positioned within the environment. The transitive device may include a transitive device optical detector configured to detect the optical signal. The transitive device may include a transitive device microcontroller capable of wireless communication. The transitive device microcontroller may be configured to identify and decode the optical signal after receipt by the transitive device optical detector to an orientation of the ZPU relative the transitive device. The transitive device microcontroller may be configured to wirelessly communicate with the ZPU to convey data the orientation of the ZPU relative the transitive device. These techniques allow for relative positioning of objects and devices within the field-of-view of the ZPU with respect to the ZPU. If the ZPU is absolutely positioned, then the objects and devices positioned through these transitive means are also absolutely positioned.

The optical signal may be modulated by the ZPU microcontroller to include data related to a position of the ZPU, the data including real-time orientation measurements of the ZPU. The zone-based positioning system may include a second beacon positioned at a second known position within the environment. The second beacon may include a second beacon optical detector configured to detect the optical signal. The second beacon may include a second beacon microcontroller capable of wireless communication. The second beacon microcontroller may be configured to identify and decode the optical signal after receipt by the second beacon optical detector to determine data related to an orientation of the ZPU. The second beacon microcontroller may be further configured to wirelessly communicate with the ZPU microcontroller to convey information including the data related to a position of the ZPU and the known position of the second beacon to the ZPU. The ZPU microcontroller may be configured to determine a position of the ZPU based additionally on the information received from the second beacon.

The zone-based positioning system may include a plurality of beacons positioned at a plurality of known positions within the environment.

An example zone-based positioning system includes a first beacon positioned at a known position within an environment. The zone-based positioning system includes a zone positioning unit (ZPU). The ZPU includes an optical source configured to transmit an optical signal to the first beacon, a range sensor configured to measure a range from the ZPU to the first beacon; and a ZPU microcontroller configured to identify the position of the first beacon based on the optical signal. The ZPU microcontroller is further configured to compute a position of the ZPU based on the range measurement from the ZPU to the first beacon, a transmission angle of the optical signal to the first beacon, and the position of the first beacon.

The first beacon may include an identifiable optical signature. The ZPU microcontroller may be configured to detect the identifiable optical signature based on the optical signal. The ZPU microcontroller may be configured to determine the position of the first beacon based on the identifiable optical signature and a database.

An example method of zone-based positioning includes providing a first beacon at a known position within an environment. The first beacon includes a beacon detector configured to receive a signal. The first beacon also includes a beacon microcontroller capable of wireless communication. The example method of zone-based positioning includes providing a zone positioning unit (ZPU). The ZPU has a signal transmission device and a ZPU microcontroller capable of wireless communication. The ZPU microcontroller is configured to modulate the signal transmission device. The example method of zone-based positioning includes directing a modulated signal from the ZPU. The example method of zone-based positioning includes decoding the modulated signal after receipt by the beacon detector to determine data related to a position of the ZPU. The data includes an orientation of the ZPU. The example method of zone-based positioning includes wirelessly communicating information from the beacon microcontroller to the ZPU including the data related to a position of the ZPU and the known position of the first beacon. The example method of zone-based positioning includes determining a position of the ZPU based on the information received from the first beacon.

The beacon detector may be a beacon acoustic detector configured to receive an acoustic signal. The signal transmission device may be an acoustic source configured to transmit the acoustic signal. The beacon detector may be a radio frequency (RF) signal detector configured to receive a RF signal. The signal transmission device may be an RF source configured to transmit the RF signal.

The example method of zone-based positioning may include measuring a range using a range sensor on the ZPU. The range may include a distance from the ZPU to one or more of the following: the first beacon; a second beacon; or an object. The example method of zone-based positioning may include directing a modulated signal from the ZPU to an object to determine data related to the ZPU position, the data including an orientation of the ZPU. The example method of zone-based positioning may include measuring the range between the ZPU and the object using a range sensor on the ZPU. The example method of zone-based positioning may include computing a position of the object based on the data related to the ZPU position and the range between the ZPU and the object.

The example method of zone-based positioning may include providing a second beacon at a second known position within the environment. The second beacon may have a second beacon detector configured to receive a signal, and a second beacon microcontroller capable of wireless communication. The example method of zone-based positioning may include decoding the modulated signal after receipt by the second beacon detector to determine data related to a position of the ZPU, the data including an orientation of the ZPU. The example method of zone-based positioning may include wirelessly communicating information from the second beacon microcontroller to the ZPU including the data related to a position of the ZPU and the known position of the second beacon. The example method of zone-based positioning may include determining a position of the ZPU based additionally on information received from the second beacon.

The example method of zone-based positioning may include providing a plurality of beacons positioned at a plurality of known positions within the environment.

Any two or more of the features described in this specification, including in this summary section, may be combined to form implementations not specifically described in this specification.

The details of one or more implementations are set forth in the accompanying drawings and the following description. Other features and advantages will be apparent from the description and drawings, and from the claims.

BRIEF DESCRIPTION OF THE DRAWINGS

So that those having ordinary skill in the art to which the disclosed system pertains will more readily understand how to make and use the same, reference may be had to the following drawings.

FIG. 10 is an overhead view of a zone-based positioning system proliferated throughout an indoor space, in accordance with the subject technology

FIGS. 12, 13A, 13B, 14A, 14B, 14C, 15A, and 15B show graphs for two-dimensional simulated and experimental systems established to test different configurations of a zone-positioning systems.

DETAILED DESCRIPTION

Figure 1:
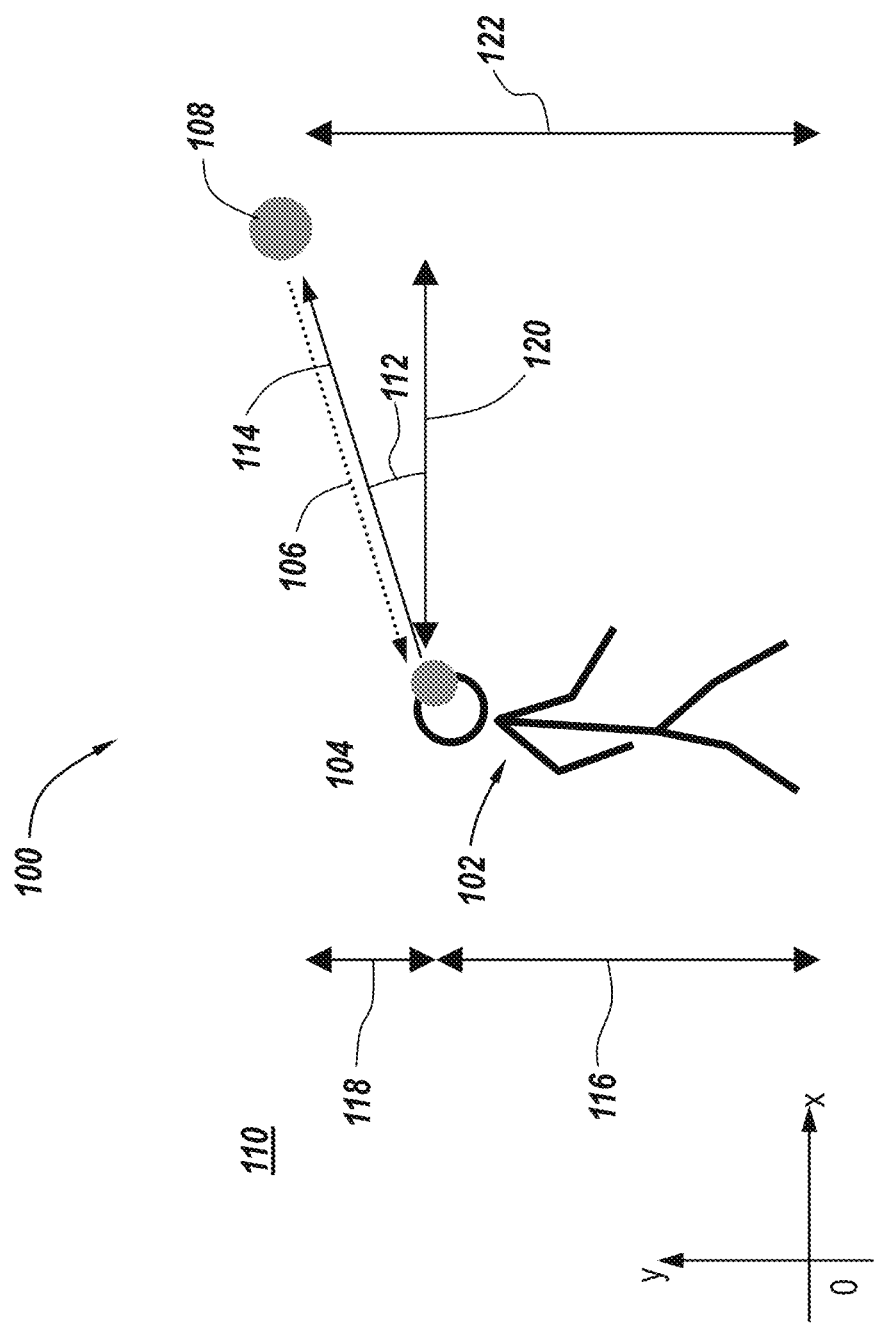
FIG. 1 is a schematic diagram of a zone-based positioning system in use, in accordance with the subject technology.

Described herein are example implementations of zone-based positioning systems and methods providing seamless, adaptable, and continuous positioning and localization in indoor environments. In this regard, a zone-based positioned system (ZPS) uses a positioning approach that extends the mobile positioning volume around a user device, capable of measuring an optical angle of departure and transmission of measured angles over an optical signal. With a zone-based positioning system, a positioning unit locates a special beacon called a trust beacon. The position of the unit may then be determined based on its orientation, pointing angles, and range received at the beacon as an optical payload and beacon coordinates at the time of reception. The positioned unit acquires the relevant data from the trust beacon via wireless backhaul, such as with radio frequency (RF). Zone-based positioning fuses three core technologies in a novel way: active anchors, angle diversity, and optical wireless communications (OWC).

With the zone-based positioning system, user devices anchor and position themselves with respect to the surrounding environment. The term anchor, referring to user devices, is defined herein as a calculated or known position within an environment such that the position can thereafter be used as a known variable in discerning the position of other devices or object. The zone-based positioning system is aware that the user is within the space, but not where the user is in the space providing a layer of privacy to the user. A zone-based positioning system includes an infrastructure side, and a user-end. The infrastructure includes components that stay put within a physical environment, such as fixed location active devices called trust beacons that are provisioned to be self-aware of their respective locations within a building or space. At the user-end is a mobile or carried units by a person or robot consisting of an inertial measurement unit, a low-power optical source for optical wireless communications, amongst other components.

The ZPS described herein uses episodic communications between the user-end device, defined herein as a zone-based positioning unit (ZPU), and a trust beacon. The initial communication is accomplished using a optical signal. Within an optical signal payload are the real-time orientation of the zone-based positioning unit, range information if present, and instructions on how to communicate back to the ZPU. Once the trust beacon receives the communication payload, that is it is within the line-of-sight beam of the optical signal, it relays a message back to the ZPU with the orientation angles it receives and with its own coordinates appended. Finally, the ZPU computes positioning using the trust beacon coordinates and the decoded angle between the ZPU and beacon.

The subject technology overcomes many drawbacks associated with systems for indoor positioning and localization. In brief summary, the subject technology relates to a zone-based positioning system involving user devices and transitive devices anchoring and positioning themselves with respect to a surrounding environment. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", "latitudinal", "longitudinal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e., where an "upper" part must always be on top).

Referring now to FIG. 1, an example zone-based positioning system 100 is shown. The zone-based positioning system includes a zone-based positioning unit (ZPU) 104. The ZPU 104 is a user device that positions itself within an environment 110 by using angle-of-departure (and optionally ranging) to estimate its position in two-dimensional and three-dimensional space. The ZPU 104 can be a headset worn on a user 102. The ZPU 104 may also be a personal device such as a mobile phone, a tablet computer, a device affixed to a robot or another vehicle, or a like device.

The ZPU 104 includes a narrow field-of-view optical source which transmits an optical signal 106. The optical signal 106 may be directional. The ZPU 104 episodically communicates via optical signal 106 with a trust beacon 108. Trust beacons 108 are fixed locations beacons commissioned with a known set of coordinates. The trust beacon 108 is located by the ZPU 104 within a field-of-view of the transmitted optical signal 106. The optical signal 106 is modulated with the ZPU 104 current angular orientation 112. Thus, when the trust beacon 108 receives the optical signal 106, that is the beacon is within line-of-sight of the ZPU transmitter, the trust beacon 108 can confirm receipt of the signal 106 and angular information 112 by a wireless back channel, such as RF: Bluetooth Low Energy or WiFi. In some instances, range information can also be derived based on the signal 106 modulation once the signal 106 is received by the trust beacon 108.

Because of a trust beacon's 108 role of position fixing (nulling accumulated position drift error) and orienting, trust beacons 108 may be placed throughout a navigated space, but also with higher frequency in areas in which higher precision positioning is desired. Inexpensive components enable proliferation of trust beacons 108 throughout a space 110 at a low system cost. Trust beacons 108 may communicate in a hierarchical or peer-to-peer mode without continuous connection to a broader network, enhancing location privacy. Trust beacons 108 are compatible with a range of ZPUs 104 of varying complexities to enable different performance levels.

The optical signal 106 between the ZPU 104 and the trust beacon 108 is accomplished using a narrow field-of-view optical source such as a low-powered laser or LED, or other optical source. As mentioned prior, the optical signal 106 include a payload transmitted from the ZPU 104. The optical signal 106 payload includes the current orientation 112 of the ZPU 104 and instructions on how to communicate back to the ZPU 104 via a wireless backchannel. The instructions include information to make a connection, such as an IP address, protocols, standards, and so on. Range information 114, such as a range between the ZPU 104 and the trust beacon 108 may also be collected by the ZPU 104 through use of a range sensor. Once the trust beacon 108 receives the payload, it relays a signal back to the ZPU 104 with the orientation 112 it receives and with the trust beacon 108 coordinates appended. Finally, the ZPU 104 computes a ZPU 104 position using the trust beacon 108 coordinates, orientation 112 including inertial measurement unit (IMU) measurements, and range 114.

For one-dimensional computation of a ZPU 104 position, a height 116 of the ZPU 104 is known. A reasonable assumption of the height 116 can be made where the ZPU 104 is head-mounted on a user 102, such as on glasses or a headset, or a fixed-height automation robot. Range information 114 is not required to calculate the ZPU 104 position in the environment 110.

For instance, a microcontroller unit on a ZPU 104 is configured to calculate a ZPU 104 position. The ZPU 104 is located at a height 116 above the lower surface of the environment 110 (e.g., a floor), referred to herein as H or $Y_H$. A trust beacon 108 also has a height 122, referred to herein as B. As such the ZPU 104 and trust beacon 108 have two-dimensional locations within an environment 110, represented by coordinates $(X_H, Y_H)$ and $(X_B, Y_B)$ respectively, where the ZPU 104 height 116, $Y_H$, is known. The ZPU 104 and trust beacon 108 are located a planar distance 114 away from each other, referred to herein as d. A vertical component 118 of that distance, referred to herein as $\Delta y$, between the ZPU 104 and the trust beacon 108 can be computed through the following equation:

$$\Delta y = Y_B - H \quad (1)$$

The horizontal component 120 of planar distance 114, referred to herein as $\Delta x$, from the ZPU 104 to the beacon 108 is thus computed through the following equation:

$$\Delta x = \frac{\Delta y}{\tan(\phi)} \quad (2)$$

where $\varphi$ is a pitch angle 112 between the ZPU 104 and the beacon 108.

Having calculated the horizontal component 120 of planar distance 114, the horizontal coordinate of the ZPU 104 can also be calculated through the following equation:

$$X_H = X_B - \Delta x \quad (3)$$

The coordinates of the ZPU 104, represented herein as $X_H$, $Y_H$, are thus accounted for.

For two-dimensional computation of a ZPU 104 position, that is, where the height of the ZPU 116 is unknown, a ranging device is equipped to the ZPU 104. Still referring to FIG. 1, ZPU 104 and trust beacon 108 have locations within an environment 110, represented by coordinates $(X_H, Y_H)$ and $(X_B, Y_B)$ respectively, where the ZPU 104 coordinates are unknown. The ZPU 104 and trust beacon 108 are located a planar distance 114 away from each other, referred to herein as d. The vertical component 118 of that distance between the ZPU 104 and the trust beacon 108 can be represented through the following equation:

$$\Delta y = d \sin(\varphi) \quad (4)$$

As such, the height 116 of the ZPU 104 from the surface of the environment 110 can be computed using the beacon 108 height coordinate 122 and the vertical component 118 through the following equation:

$$Y_H = Y_B - \Delta y \quad (5)$$

In this regard, the horizontal component 120 of planar distance d, referred to herein as $\Delta x$, from the ZPU 104 to the beacon 108 is represented through the following equation:

$$\Delta x = d \cos(\varphi) \quad (6)$$

Where $\varphi$ is a pitch angle 112 between the ZPU 104 and the beacon 108, represented as 112. Having calculated the horizontal component 120 of the distance d from the ZPU 104 to the beacon 108, the horizontal coordinate of the ZPU 104 can also be calculated through the following equation:

$$X_H = X_B - \Delta x \quad (7)$$

As such, the ZPU 104 coordinates, $(X_H, Y_H)$, are accounted for. Computation for the third-dimension is described later.

Figure 2:
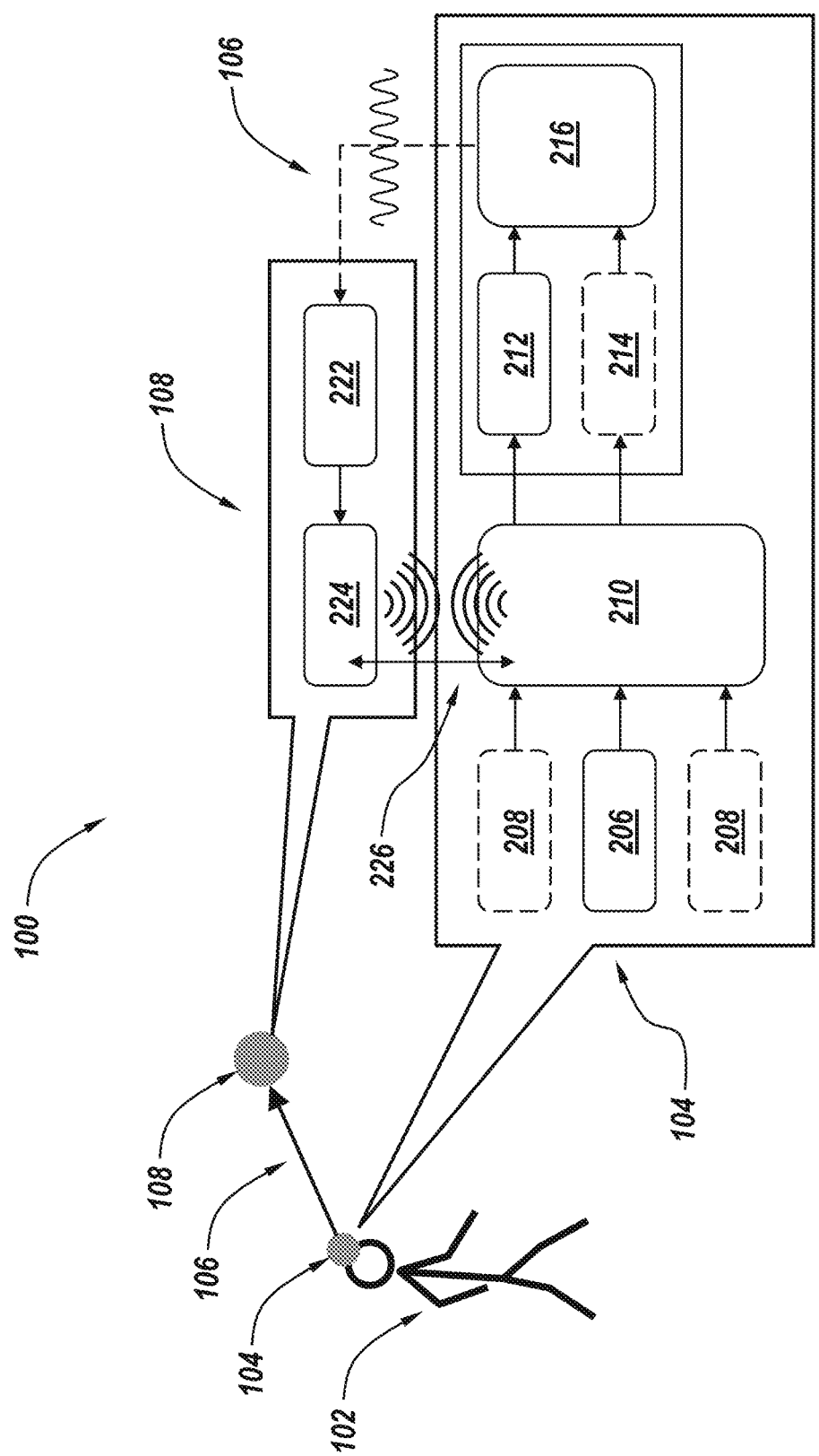
FIG. 2 is a block diagram of the components of the zone-based positioning system of FIG. 1.

Referring now to FIG. 2, the components of the zone-based positioning system 100 of FIG. 1 are shown. The ZPU 104 includes an inertial measurement unit (IMU) 206. The IMU 206 measures the ZPU 104 specific force, angular rate, and orientation of the ZPU 104 using a combination of accelerometers, gyroscopes, and magnetometers. A configuration of the IMU 206 includes one accelerometer, one gyroscope, and one magnetometer per axis for each of the three principal axes as explained with reference to FIG. 3: pitch, roll, and yaw. The ZPU 104 also includes a microcontroller unit (MCU) 210. The MCU 210 contains one or more central processing units and memory. The MCU 210 measures the real time force, angular rate, and orientation of the ZPU. The MCU 210 is also capable of wireless communication. Wireless communication includes optical wireless communication. Wireless communication also includes directional wireless communication. In this regard, the MCU 210 may include a radio-frequency module to transmit or receive radio signals. As such, the MCU 210 can communicate with the trust beacon without needing line-of-sight communications 108.

The MCU 210 is also capable of determining a position of the ZPU 104 through communication with the trust beacon 108. From the trust beacon 108, the MCU 210 receives data including an orientation 112 of the ZPU 104 and receives beacon 108 coordinates to thereafter compute a location of the ZPU 104 in the environment 110 as explained herein.

The MCU 210 may also compute a beacon 108 position based on an optical signal 106, using a narrow field-of-view optical source 216 such as a low-powered laser or LED, or other optical source such as a modulated laser beam, capable of transmitting an optical signal 106 to the beacon 108. In this regard, the ZPU 104 includes an optical driver 212, for example a laser driver, and the narrow field-of-view optical source 216, for example a laser diode. The optical driver 212, controlled by the MCU 210, provides a current to the narrow field-of-view optical source 216 to control the optical output while protecting the narrow field-of-view optical source 216 from over current conditions. The optical driver 212 converts electrical signals to optical signals. In some implementations, the optical driver 212 may include a resistor and amplifier where the amplifier measures the voltage across the resistor and controls output in a feedback loop to maintain the resistor voltage as close as possible to a control voltage. Direct modulation of the narrow field-of-view optical source 216 can be completed by altering the control voltage. External modulation of the narrow field-of-view optical source 216 can be completed through use of a light modulator. The narrow field-of-view optical source 216 is continually modulated by the MCU 210 with the real-time measured orientations so that whenever the optical signal 106 reaches a trust beacon 108, the trust beacon 108 can initiate a return message 226 and the ZPU 104 can position itself with the new information provided by the trust beacon 108. The payload of the optical signal 106 is relatively small such that on-off-keying at low intensities is sufficient, though other modulation formats are also sufficient.

The modulated narrow field-of-view optical source 216 emits the optical signal 106 in a line-of-sight nature, allowing the optical signal 106 to be treated as a ray, such that the pitch 112 between the ZPU 104 and beacon 108 is relevant to ZPU 104 positioning. The modulated optical signal 106 is received by a beacon detector 222, such as a photodetector or optical receiver, on the trust beacon 108 wherein the optical signal 106 is converted into an electrical current. In other implementations, the narrow field-of-view optical source 216 emits an optical signal 106 toward an identifiable optical signature on a trust beacon 108. The MCU 210 is configured to detect the identifiable optical signature, based on the optical signal 106, and determines the position of the beacon 108 based on the identifiable optical signature and a database. The identifiable optical signatures include formats such as quick response (QR) code, barcodes, or other static or dynamic optical codes.

The trust beacon 108 includes a MCU 224 to demodulate or decode the optical signal from the beacon detector 222. The MCU 224 identifies and decodes the optical signal 106 after receipt by the beacon detector 222 to determine data related to the ZPU 104, such as the orientation 112 of the ZPU 104 relative the trust beacon 108. The MCU 224 thereafter wirelessly communicates a return message 226 with the MCU 210 of the ZPU 104 to transmit the trust beacon location 108 in the environment and the data related to the ZPU 104, such as the orientation 112 of the ZPU 104. This return message 226 is completed through a wireless communications, such as a radio frequency, backhaul, or back channel Where the height 116 of the ZPU 104 is known, the MCU 210 thereafter computes a ZPU 104 location within the environment.

Where the height 116 of the ZPU 104 is unknown, the ZPU 104 includes a range sensor 208 to measure a planar, or Euclidean, distance between the ZPU 104 and the trust beacon 108. The range sensor 208 may include light and radio frequency ranging via radio signal strength, ultra-wideband signals, millimeter wave, radio frequency, RADAR, time of flight, rotating laser, images, or LiDAR. Resulting ranging information may be appended to the optical signal 106 and received by the trust beacon 108, wherein the range information is relayed back to the ZPU 104 through a return message 226.

In some implementations, the ZPU 104 may also include a steerable system 214 to direct the optical signal 106 to scan the environment 110 for the beacon 108 as an optical target. The steerable system 214 may include a steerable micro-electromechanical system, electro-optical system, holographic system, or plasmonics system.

The ZPU 104 may also include a gaze-tracking system 228 configured to track an eye position of a user 102 or a line of sight of the user 102. The MCU 210 may direct the IMU 206 to measure an orientation 112 based on the eye position of the user 102. In this regard, the ZPU 104 may thereafter transmit from the narrow field-of-view optical source 216 an optical signal 106 based on the direction of the user 102 eye position.

In some implementations, the ZPU 104 may include an acoustic source configured to relay an orientation or range of the ZPU 104. In this regard, the beacon detector 222 may include an acoustic detector such as a geophone, hydrophone, microphone, pickup, seismometer, or sound locator. Thus, the beacon detector 222 is configured to receive an acoustic signal from ZPU 104.

In some implementations, the ZPU 104 may include a beam formed radio frequency source configured to relay an orientation or range of the ZPU 104. In this regard, the beacon detector 222 may include a radio frequency signal detector such that the beacon detector 222 is configured to receive a radio frequency signal from the ZPU 104.

Figure 3A:
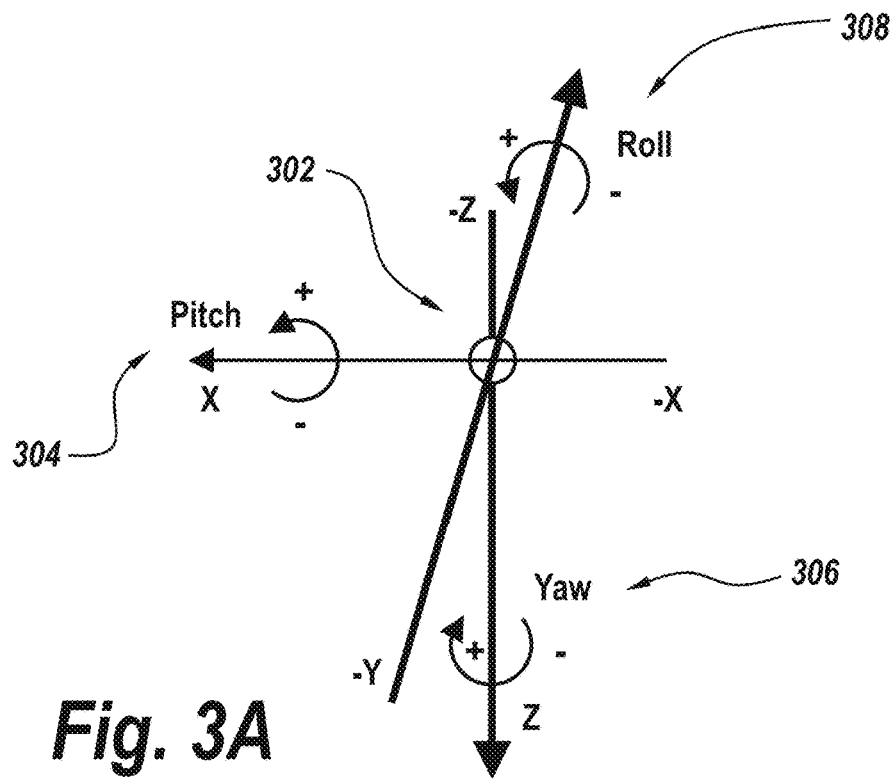
FIG. 3A is a graph of orientations utilized for measurements within a zone-based positioning unit, in accordance with the subject technology.
Figure 3B:
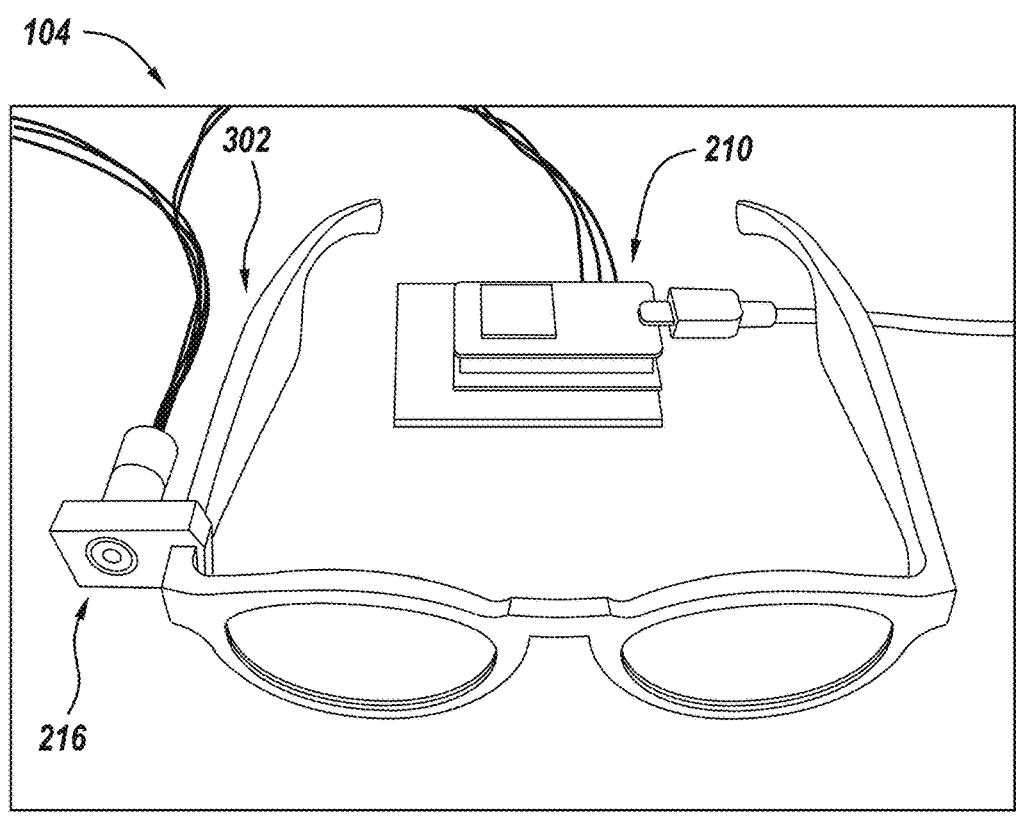
FIG. 3B is a perspective view of a zone-based positioning unit, in accordance with the subject technology.

FIG. 3A-3B show the components and orientations of the ZPU 104 implemented within a pair of glasses, allowing it to be worn on the head of a user, but could be employed with different structural components in other instances. As mentioned prior, the ZPU 104 includes a narrow field-of-view optical source 216 to transmit an optical signal 106 to the trust beacon 108, and an MCU 210.

For sake of explanation of orientation, a reference point 302 is included on ZPU 104. As such, the ZPU 104 orientation relative to the reference point 302 is used to compute the ZPU 104 location in an environment 110. The orientation values measured by the IMU 206 are pitch 304 and yaw 306 angles, $\varphi_i$ and $\theta_i$ respectively where i refers to a trust beacon 108. The IMU 206 may also measure a roll 308 of the ZPU 104, though roll 308 is negligible where the ZPU 104 sits symmetrically on a user 102.

Figure 4:
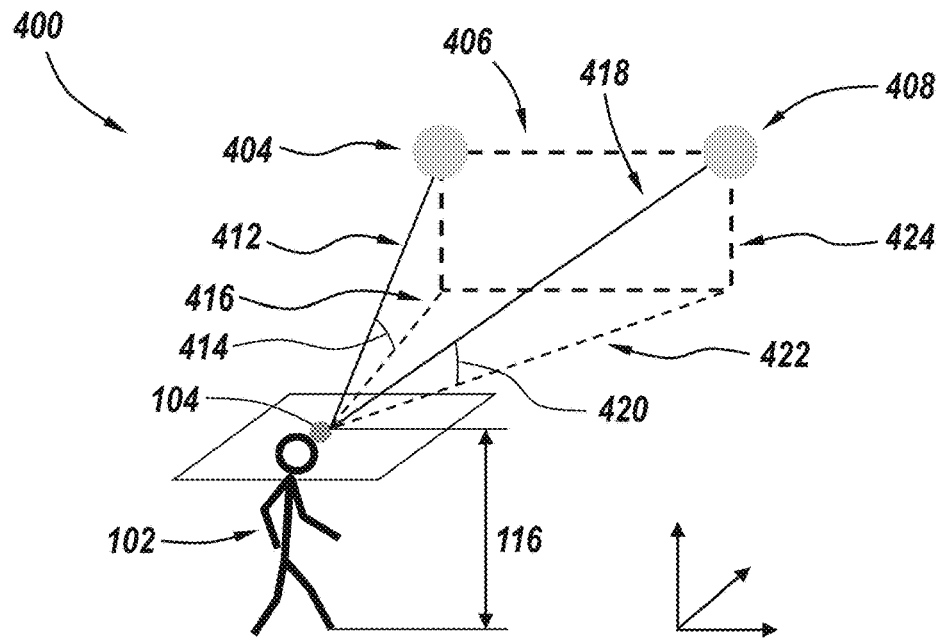
FIG. 4 is a three-dimensional orthographic view of a zone-based positioning system in use, in accordance with the subject technology.
Figure 5:
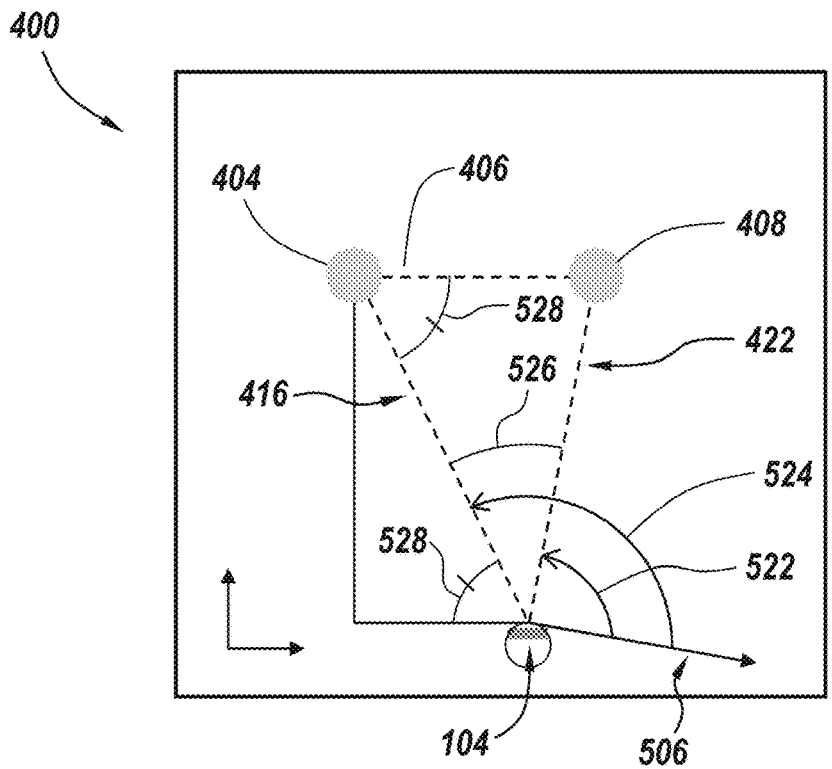
FIG. 5 is a top view of the zone-based positioning system in use of FIG. 4.

Referring now to FIG. 4 and FIG. 5, a side orthographic view and a top view of FIG. 4 are shown, the system having two trust beacons 404 and 408. Zone-based positioning system 400 includes a ZPU 104 worn by a user 102, or a personal device such as a mobile phone, iPad, a device affixed to a robot or another vehicle, or a like device. The ZPU 104 can interact with the trust beacons 404, 408. For explanatory purposes, trust beacon 404 is acting as an origin in the X, Y plane relative a three-dimensional coordinate system. Therefore, trust beacon 404 is located at coordinates (0, 0, $Z_1$) with respect to a (X, Y, Z) coordinate system. Trust beacon 408 has three-dimensional coordinates of (C, 0, $Z_2$) with respect to the same (X, Y, Z) coordinate system, where C represents a planar distance between trust beacon 404 and 408. Trust beacons 404, 408 are fixed locations beacons commissioned with information of their respective coordinates. The trust beacons 404, 408 are located by the ZPU 104 within a field-of-view of a narrow field-of-view optical source 216 included within the ZPU 104. As mentioned prior, the optical source 216 is modulated and transmits an optical signal 106 based on its current orientation with respect to the target trust beacon 404, 408. Then the trust beacon 404, 408 confirms reception of the angular information by a wireless back channel, such as Bluetooth Low Energy, WiFi or other communications medium, including appending the trust beacon 404, 408 coordinates.

In this implementation, measured values at the ZPU 104 headset are pitch and yaw angles, $\varphi_i$ and $\theta_i$, where i refers to either trust beacon 404, 408. When subjected to uniform noise, pitch and yaw angles are represented as $\hat{\varphi}_i = \varphi_i + \varphi_n$ and $\hat{\theta}_i = \theta_i + \theta_n$. The roll of the ZPU 104 is negligible as the ZPU 104 sits symmetrically on the user 102. Due to no prior reference heading direction, yaw is measured from a fixed but unknown vector v, referred to herein as 506. In the system 400, two trust beacons 404, 408 are employed, the beacons 404, 408 placed a planar distance, C, away from one another laterally, the distance referred to herein as 406, to calibrate yaw, $\theta$. The trust beacons 404, 408 are located a radial distance away from ZPU 104, represented herein as $R_1$, 412, and $R_2$, 418.

Pitch and yaw are measured respective to the horizon and thus can be pre-calibrated. From the pitch angles $\varphi$, referred to herein as 414 and 420; known ZPU height 116; and beacon 404, 408 coordinates, horizontal components of planar distances 412, 418, referred to herein as A and B, or 416 and 422 respectively, between the user 102 and the trust beacons 404, 408 can be computed using the following equations:

$$B = \frac{|\Delta|}{\tan(\varphi_1)}, A = \frac{|\Delta|}{\tan(\varphi_2)}, \quad (8)$$

where $\varphi_1$ is angle 414, $\varphi_2$ is angle 420, and $\Delta$ is the difference between the ZPU 104 height, H, represented herein as 116, and the height of the trust beacon 404, 408, referred to herein as Z. H is known in some scenarios, and the height Z of the trust beacon 404, 408 is communicated via a return message 226 from the trust beacon 404, 408 to the ZPU 104.

The yaw aspect of the ZPU 104, $\theta_A$, referred to herein as 528, can thereafter be computed. Beacons 404, 408 are located an angle $\theta_C$, referred to herein as 526, away from one another relative the ZPU 104 location. Beacon 404 is located at an angle $\theta_2$, referred to herein as 524 away from vector 506. Beacon 408 is located an angle $\theta_1$, referred to herein as 522, away from vector 506. $\theta_C$ can be represented as the difference between $\theta_2$ and $\theta_1$. As such, the yaw of the ZPU 104 can be computed using the following equation:

$$\theta_A = \sin^{-1}\left[\frac{A \sin(\theta_C)}{C}\right] \quad (9)$$

Although the distance between trust beacons 404 and 408, C, is defined and known, confining C may force $\triangle ABC$ to not converge, resulting in a scenario where no triangle solution is possible from measured data. In that case, lateral displacement $\hat{C}$ between trust beacons 404 and 408 can be computed using the following equation:

$$\hat{C} = [A^2 + B^2 - 2AB \cos(\theta_C)]^{1/2} \quad (10)$$

From $\theta_A$, the coordinates of the ZPU 104, $\hat{x}$ and $\hat{y}$, can be estimated through the following equations:

$$\hat{x} = B \cos(\theta_A), \hat{y} = B \sin(\theta_A) \quad (11)$$

For the three-dimensional scenario, where the ZPU 104 height 116 is unknown, another measurement in the form of range is required. ZPU 104 may include a range sensor 208, which may be provided in a multitude of ways with different accuracies: light and radio frequency ranging via radio signal, strength, ultra-wideband signals, millimeter wave, radio frequency, RADAR, time of flight, rotating laser, images, or LiDAR. With LiDAR for example, a radial distance between a trust beacon 404, 408 and the ZPU 104, $R_i$ is measured, where i refers to a trust beacon 404, 408. A and B are now calculated from $R_1$ and $R_2$ using the following equations:

$$B = R_1 \cos(\varphi_1), A = R_2 \cos(\varphi_2) \quad (12)$$

The height of the ZPU 104 can be computed using the known height Z of either trust beacon 404, 408 through the following equation:

$$\hat{z}_1 = Z - B \tan(\varphi_1), \hat{z}_2 = Z - A \tan(\varphi_2) \quad (13)$$

After the height of the ZPU 104 is computed in a three-dimensional scenario, equations 8-12 thereafter apply. Note, the height of the ZPU 104 with respect to different trust beacons 404, 408 can be averaged for a height estimate. In fact, in a system 400 with a plurality of beacons, any number of beacon measurements encountered can be averaged for height improvements over time using the following equations:

$$\hat{z}_i = Z - R_i \sin(\varphi_i) \quad (14)$$

$$\hat{Z} = \frac{1}{N} \sum_{i=1}^{N} \hat{z}_i \quad (15)$$

where N is the total number of beacons with measurement data, $R_i$ is the radial distance between the trust beacon 404, 408 and the ZPU 104 measured with a ranging sensor, and $\varphi_i$ is the angle related to the radial distance measured by the ZPU 104. In practice, $R_i$ is subjected to error, $\in_R$.

Figure 6:
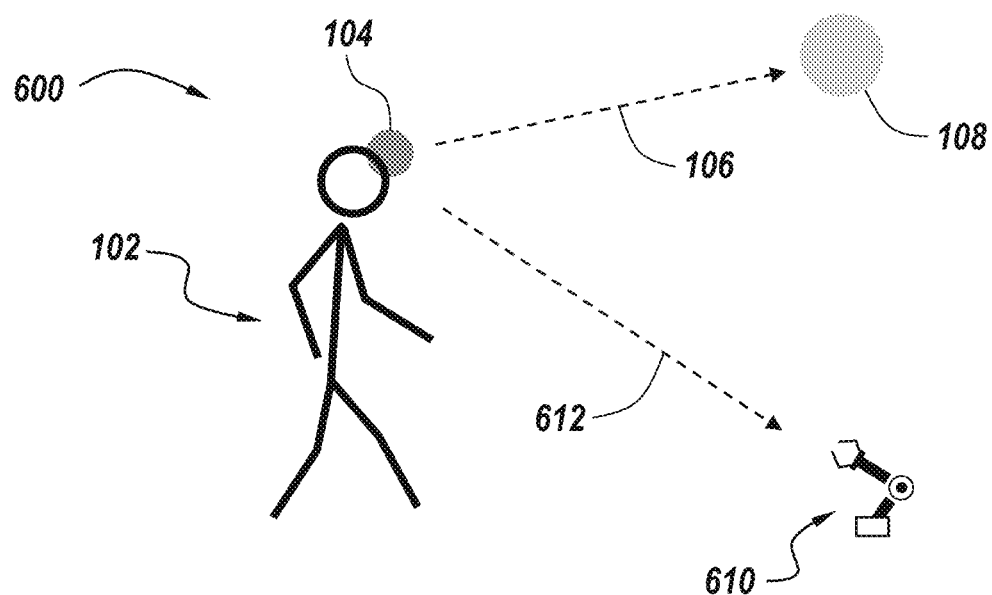
FIG. 6 is a schematic diagram of a zone-based positioning system in use, including a peripheral object, in accordance with the subject technology.

Referring now to FIG. 6, a zone-based positioning system 600 is shown including an object 610. The zone-based positioning system 600 includes a ZPU 104. As with zone-based positioning system 100, an optical signal 106 is transmitted between the ZPU 104 and trust beacon 108, including a payload transmitted from the ZPU 104. In this regard, the optical signal 106 includes the current orientation 112 of the ZPU 104 and instructions on how to communicate back to the ZPU 104 via an RF backchannel. Range information, such as a range between the ZPU 104 and the trust beacon 108 may also be collected by the ZPU 104 through use of a range sensor. Once the trust beacon 108 receives the payload, it relays a signal 106 back to the ZPU 104 with the orientation it receives and with the trust beacon 108 coordinates appended. Finally, the ZPU 104 computes a ZPU 104 position using the trust beacon 108 coordinates, orientation 112 including IMU measurements, and range 114.

A key feature of an angle-of-arrival sensor aboard the ZPU 104, such as an IMU 206, is that once the ZPU 104 is localized, it can position other objects 610 within its "zone" radius and field of view, referred to herein as transitive positioning. Transitive positioning is accomplished by reusing the same narrow field-of-view optical source 216 and a range sensor 208 on the ZPU 104 used to target trust beacons 108 to also target secondary peripheral objects 610. In this regard, the ZPU 104 is used as a reference point, directing an optical communication to other objects. Transitive positioning is analogous to the use of a theodolite, which can utilize distance and an angle to well-known positions to estimate the range and bearing to other objects 610.

Object 610 can be passively or actively positioned. In the active case, object 610 is a transitive device. Therein, angles are communicated similar to the ZPU 104 and trust beacon 108 interaction. In this regard, the object 610 includes a transitive device optical detector, such as a photodetector, to detect the optical signal 612 from the ZPU 104, and a transitive device MCU capable of wireless communication. Thus, the object 610 has the same components as a trust beacon 108 as explained prior. The transitive device MCU is configured to identify and decode the optical signal 612 after receipt by the transitive device optical detector to determine data related to a position of the ZPU 104, such as an orientation of the ZPU 104. In this case, the angles of the ZPU 104 relative the object 610 are decoded by an active receiver. The transitive device MCU is configured to wirelessly communicate with the ZPU 104 to convey the measured orientation of the ZPU 104, data related to a position of the object 610, and range measurements.

In the passive case, the user 102 targets and identifies the object 610 with the ZPU 104 to position the object 610. As such, the ZPU 104 is configured to transmit the optical signal 612 to the object 610 to determine the ZPU 104 orientation relative the object 610. The ZPU 104 is configured to measure the range between the ZPU 104 and the object 610. The ZPU 104 is configured to determine a position of the object 610 based on the orientation relative the object 610 and the range between the ZPU 104 and object 610.

Figure 7:
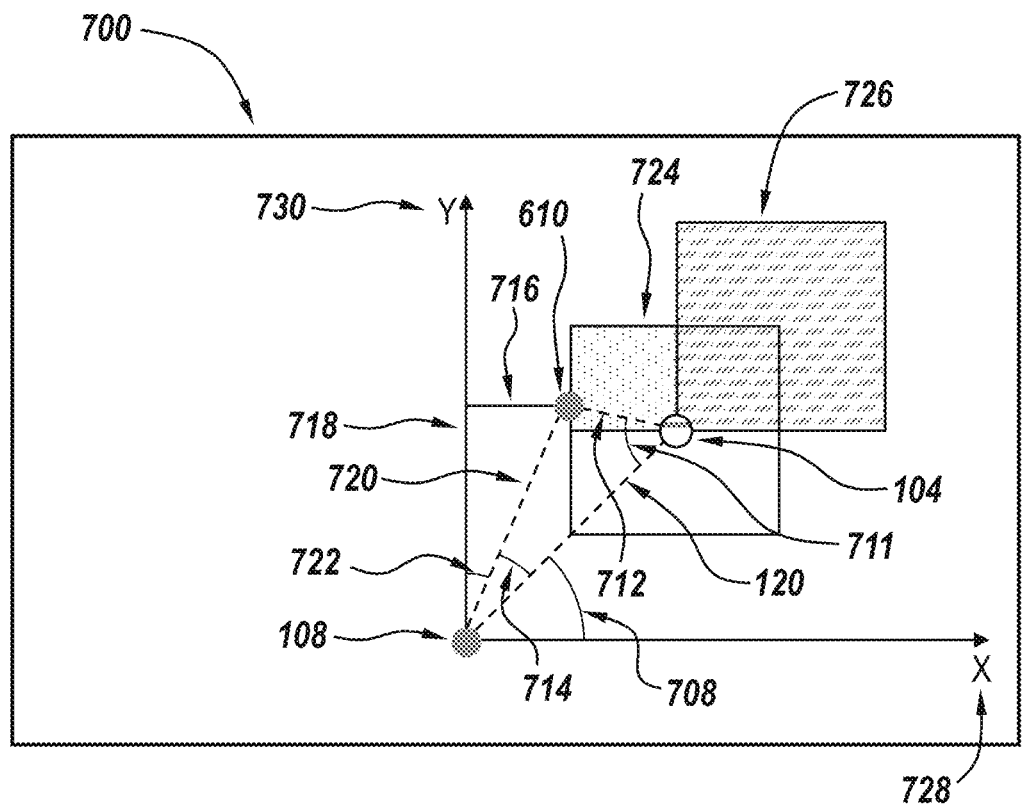
FIG. 7 is a top orthographic view of a zone-based positioning system in use, including a peripheral object, in accordance with the subject technology.
Figure 8:
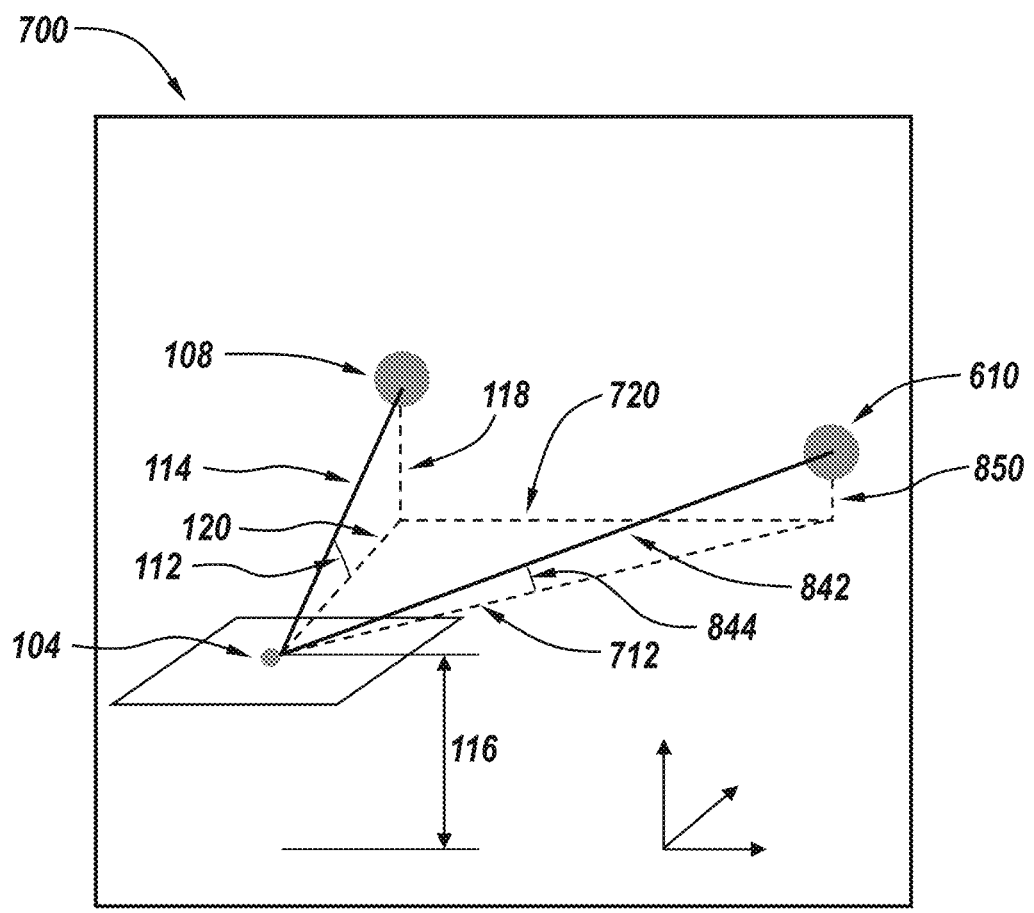
FIG. 8 is a three-dimensional orthographic view of the zone-based positioning system in use of FIG. 7.

Referring now to FIGS. 7-8, a top orthographic view and a side orthographic view of a zone-based positioning system 700 are shown, the system 700 having a trust beacon 108 and an object 610. The system 700 may be bound by a coordinate system having an x-axis 728 and a y-axis 730, where the trust beacon 108 is situated at the origin for explanatory purposes. Object 610 is located at a vertical position 718, $\hat{y}_t$, and a horizontal position 716, $\hat{x}_t$, within the coordinate system. A yaw angle, $\theta_D$, referred to herein as 711, between a trust beacon 108 and the object 610 is measured at the ZPU 104 similarly to how $\theta_C$ was measured with respect to FIG. 5. FIGS. 7-8 show the transitive geometry with respect to the direct positioning zone 726 for the case where yaw is positive, 180°>$\theta_D$>0°, and for one quadrant of the object zone 724. When yaw is negative, the geometry is flipped. As such, computation may be achieved for a single object zone 724 quadrant; the other three quadrants computed through coordinate transformations.

The planar distances between the object 610, beacon 108, and ZPU 104 make up triangle ΔTBD. T is the planar distance between the ZPU 104 and the object 610, referred to herein as 712. B is the planar distance between the ZPU 104 and the beacon 108, referred to herein as 120. D is the planar distance between the trust beacon 108 and the object 610, referred to herein as 720.

In the case where the ZPU 104 height 116 is unknown, ranging information is used. T and B are calculated as A and B were calculated with reference to zone-based positioning system 400 using equation 12. As such, the radial distance $R_T$, referred to herein as 842, between the ZPU 104 and the object 610 is used with equation 12. Similarly, the radial distance $R_1$, referred to herein as 114, between the ZPU 104 and the trust beacon 108 is used with equation 12. D and $\theta_T$, referred to herein as 714, are calculated using the Law of Cosines and Law of Sines respectively using the following equations:

$$D = [T^2 + B^2 - 2TB\cos(\theta_D)]^{1/2} \quad (16)$$

$$\theta_T = \sin^{-1}\left[\frac{T\sin(\theta_D)}{D}\right] \quad (17)$$

The angle between the trust beacon 108 and the ZPU 104, $\theta_3$, bound by the x axis 728, can be computed based on the ZPU 104 location, the angle referred to herein as 708:

$$\theta_3 = \tan^{-1}\left[\frac{\hat{x}}{\hat{y}}\right] \quad (18)$$

For the 180°>$\theta_D$>0° case, the constraint of $\theta_4$=90°−$\theta_T$−$\theta_3$ can be introduced to estimate the object location, $\theta_4$ is the angle formed by the y-axis 718 and D, the angle referred to herein as 722, Thus, the object 610 coordinates, $\hat{x}_t$, $\hat{y}_t$, can be computed using the following equations:

$$\hat{x}_t = D\sin(\theta_4), \hat{y}_t = D\cos(\theta_4) \quad (19)$$

The z coordinate estimate of the object 610, $\hat{z}_t$, is based on the pitch angle, $\varphi_T$, referred to herein as 844, between the ZPU 104 and the object 610. Depending on whether $\varphi_T$ is positive or negative, the following equations can be used to compute the object z coordinate:

$$\Delta T = |R_T \sin(\varphi_T)| \quad (20)$$

$$\hat{Z} = \begin{cases} z + \Delta T & \text{if } \phi_T > 0 \\ z - \Delta T & \text{if } \phi_T < 0 \end{cases} \quad (21)$$

where ΔT is the height 850 of the object 610.

Figure 9:
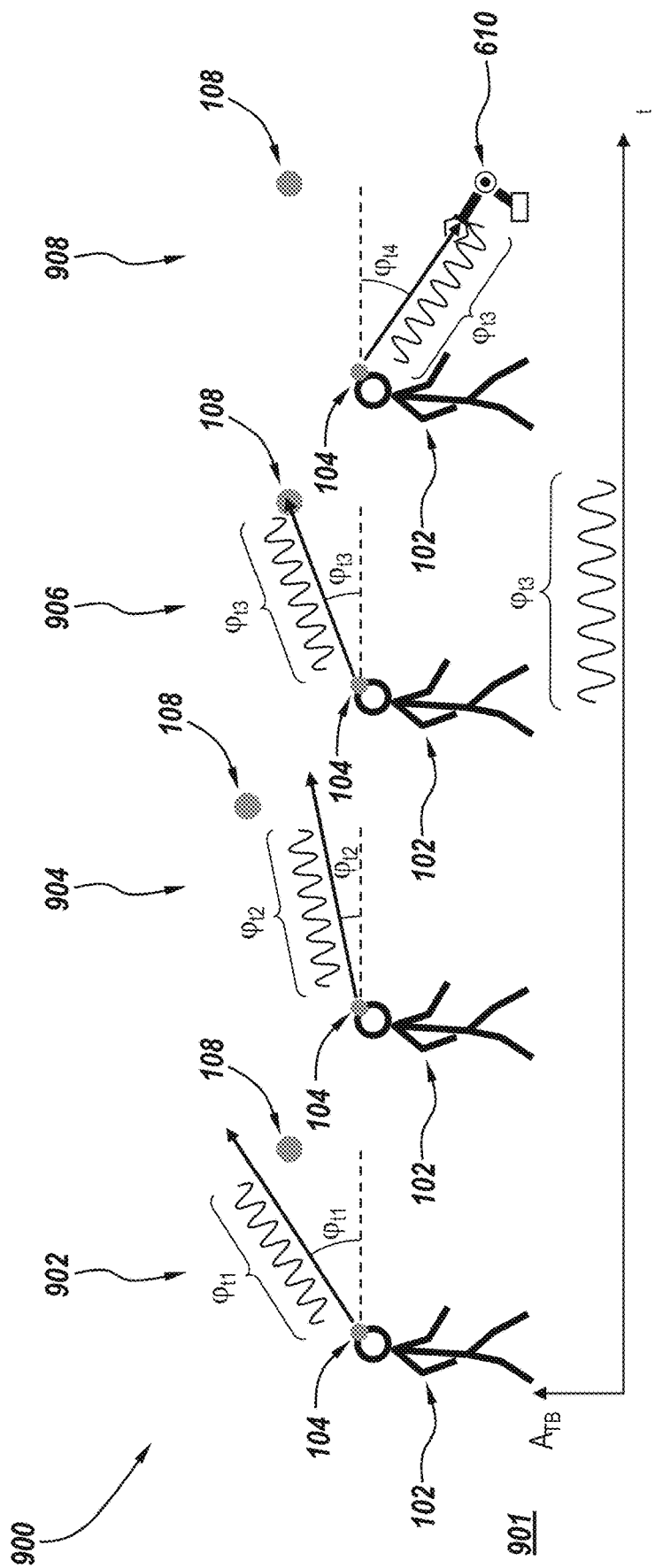
FIG. 9 is a perspective view of several time-based instances of using a zone-based positioning unit as part of a zone-based positioning system, in accordance with the subject technology.

Referring now to FIG. 9, an example zone-based positioning system 900 is shown including several time instances 902, 904, 906, 908 of ZPU 104 orientations. The ZPU 104 in zone-based positioning system 900 includes a steerable system to direct the optical source to scan the environment 901. The ZPU 104 can continuously scan the environment 901 in each direction, but represented as vertical direction for simplicity in FIG. 9, as progressing through the several instances 902, 904, 906, 908 of ZPU 104 orientations. The ZPU 104 therein may alternatively include a gaze-tracking system to track an eye position of a user 102 and direct the optical source based on the eye position of the user 102. In this regard, the ZPU 104 optical source may progress through several instances 902, 904, 906, 908 based on a steerable system or the eye position of the user 102.

As mentioned prior, the ZPU 104 measures orientation with respect to the reference axes 304, 306, 308 of FIG. 3A and then encodes that information onto the optical payload of its narrow field-of-view optical source 216 in preparation to hit a target and complete a data transfer. This transfer engages when a user 102 directs the optical signal 106 onto a trust beacon 108, such as in instance 906. Also within the narrow optical signal 106 payload is continuously updated range information, if present, and instructions on how to communicate back to the ZPU 104 via an RF backchannel. The narrow field-of-view optical source 216 is continually modulated so that once the optical signal 106 hits a target trust beacon 108 receiver, the trust beacon 108 can initiate a return call to the ZPU 104 with updated measurements. The signal between the ZPU 104 and the trust beacon 108 is null at the photodetector of the trust beacon 108 until the narrow field-of-view optical source 216 targets the trust beacon 108 with its pointing angles, $\varphi_t$, at a given time instance t. As such, real-time orientation measurements of the ZPU 104 are transmitted. Once the trust beacon 108 receives the payload, it relays a message back to the ZPU 104 with the orientation angles it received but also appending the trust beacon 108 coordinates. Finally, the ZPU 104 computes a ZPU 104 position using the trust beacon 108 coordinates and measured angles and ranges. Once the ZPU 104 computes a ZPU 104 position after making contact with the trust beacon 108 as in instance 906, the ZPU 104 can thereafter compute the location of the object 610, after scanning the object 610 with the narrow field-of-view optical source 216, as seen in instance 908. This can be done as explained prior with reference to FIGS. 7-8.

Referring now to FIG. 10, an overhead view of an example zone-based positioning system 1000 proliferated through an indoor space 1001, in accordance with the subject technology, is shown. As mentioned with other zone-based positioning systems described herein, zone-based positioning system 1000 includes a plurality of trust beacons 108 positioned through the interior of indoor space 1001. A network of users 102 travel throughout indoor space 1001, each user 102 equipped with a ZPU 104 in accordance with the subject technology. As such, each ZPU 104 in zone-based positioning system 1000 may compute a respective ZPU 104 location. Each ZPU 104 in zone-based positioning system 1000 may communicate with one another and to a central control system 1020 regarding the respective ZPU 104 locations. In this regard, real-time positioning of users 102 throughout an indoor environment 1001 can be tracked and optimized. The indoor space 1001 may also include objects 610, wherein users 102 can orient a respective ZPU 104 toward the object 610 to determine the object 610 location.

FIG. 11 shows graphs 1102(a) and 1102(b) illustrating data collected from performance testing using the ZPU 104 referenced in FIG. 3A-3B. The experimental prototype ZPU 104 was a headset with a 5 mW, 650 nm red TTL-transistor-transistor logic-laser (Adafruit part no. 1056) and an Adafruit variant ESP32 MCU fitted to a pair of Bose Frames. The Bose Frames are a commercial off-the-shelf audio AR headset with built-in inertial measurement units 206 including an accelerometer, gyroscope, and magnetometer. The Bose Frames API uses these sensors to compute a quaternion that converts to Euler angles: pitch, roll, and yaw as shown in FIG. 3A. The laser is driven using the UART communication protocol, which is an OOK modulation common with MCUs, at a baud rate of 115.2 kbps. The trust beacon is a Thorlabs PIN PD (part no. PDA36A) with another ESP32 MCU.

The prototype ZPU 104 is mounted on an optical breadboard for stability, which, in turn, is fastened to a sturdy tripod. The tripod enables adjustment of height, pitch, and yaw reliably and quickly. The entire system is placed within the coverage of a motion capture camera system (Optitrack) to measure the coordinates of the ZPU down to millimeters. The trust beacons are placed on an elevated cage.

For supporting accurate positioning, repeatability of measurements taken after various translations and rotations of the ZPU 104 are of moment, as shown in graphs 1102(a) and 1102(b). Experimentation revealed that in the case of a fixed position (no motion), the ZPU 104 reveals consistent measurements in returned pitch, roll, and yaw when exposed to motions, confined to movements less than 10 m from starting location and accelerations less than 9.8 m/s² (gravity).

Figure 11A:
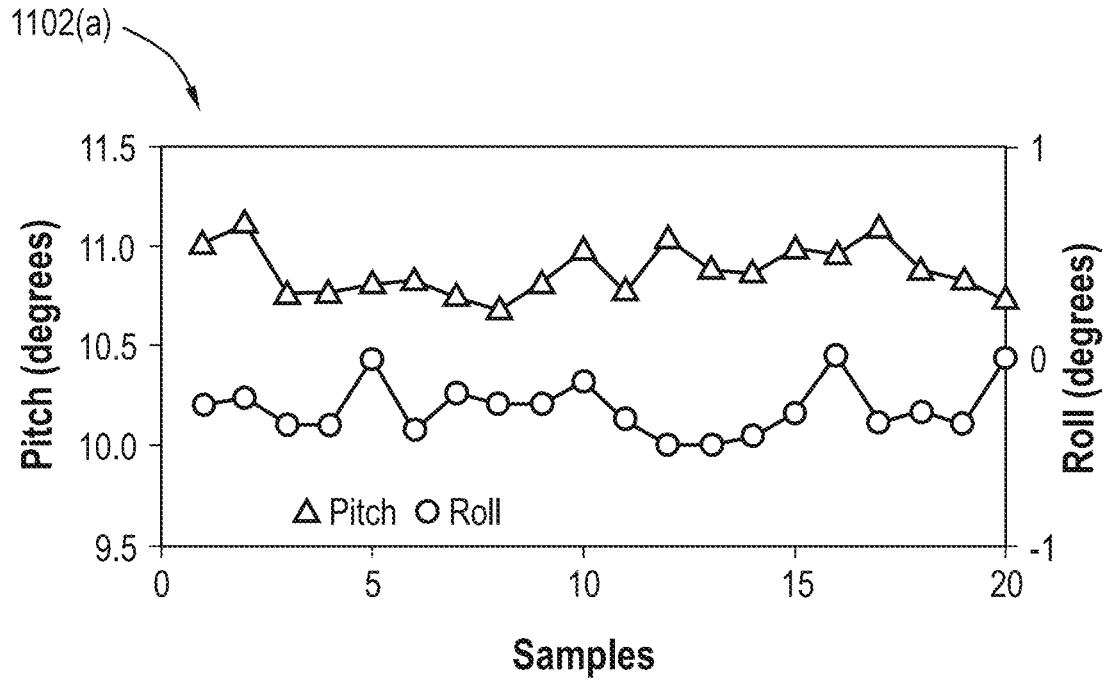
FIGS. 11A-11B show graphs illustrating data collected from performance testing using the zone-based positioning unit referenced in FIG. 3A-3B.
Figure 11B:
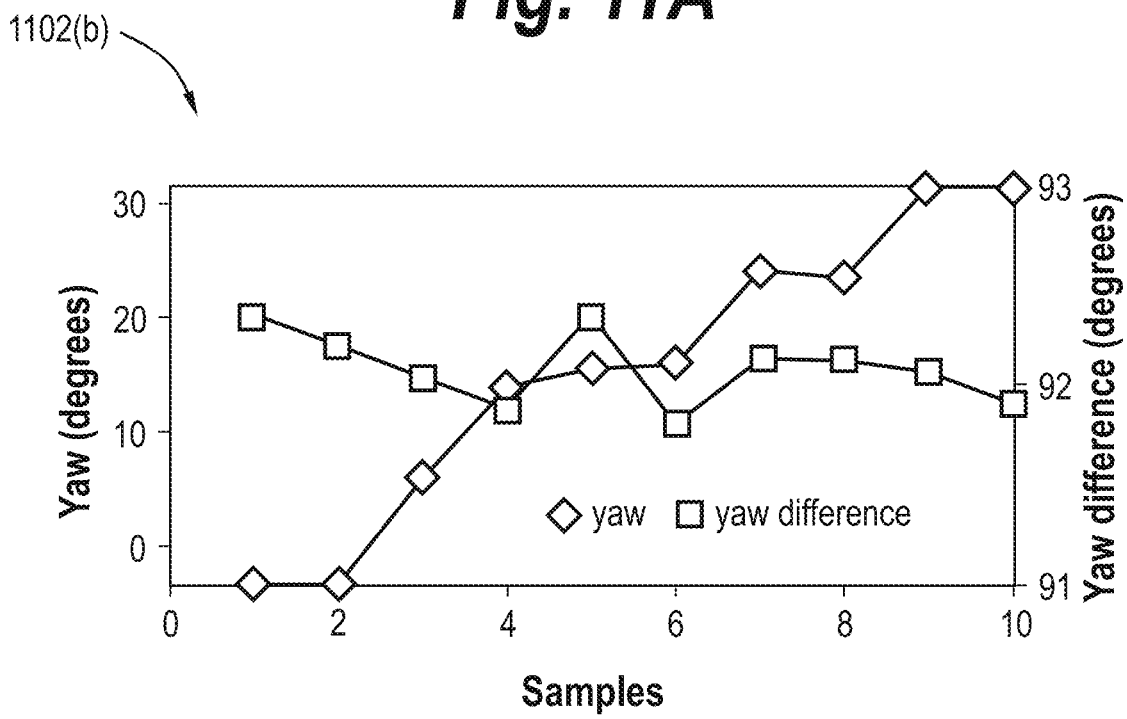

In this experimentation, the pitch, roll, and yaw of the ZPU 104 were measured at a known location. The Bose Frames were moved erratically (e.g., a motion that is jerky, smooth, quick, elaborate, small, large, etc.) and were placed back at the knock location to remeasure the pitch, roll, and yaw angles. This procedure was repeated for 20 samples. FIGS. 11A-11B show the raw measured angles. With the pitch and roll, the measurements remained consistently within ±0.5° of the mean, whereas with the yaw, the measurements drift upwards. This is due to pitch and roll measured relative to gravity and the horizon and yaw having no reference point. The lack of yaw reference can be cured by calibrating between two points. Graph 1102(b) shows that when the difference between two yaw measurements is taken, by rotating the device between two known locations, i.e., beacons, the angle differences between the measurements are now consistent with the pitch and roll measurements and within ±0.5° of the mean. As such, the ±0.5° error is simulated herein as noise with respect to angles $\varphi_n$ and $\theta_n$.

Yaw accuracy may also be increased by using the yaw angle difference of a MEMS steerer, as referenced above, which can bring the noise error to less than 0.01° discussed in further detail below. It is possible to reference magnetic north using the magnetometer, but the technique is not, reliable indoors. Higher-end EMUs 204 and different algorithms beyond the commercial off-the-shelf Bose Frame system for calculating pitch and yaw may be implemented.

Referring now to FIGS. 12-15, results are displayed for two-dimensional simulated and experimental systems established to test different configurations of a zone-positioning systems to compare to other light-based AOA indoor positioning approaches. The conditions simulated demonstrate the effects of different configurations such as the use of MEMS steering and different trust beacon placement locations. The experimental parameters show performance using commercial off-the-shelf components. Table 1202 summarizes these parameters, where not previously defined parameters X and Y are the test coordinate locations. For test coordinates, a 1 m by 1 m plane at least 1 m away from a first trust beacon ($TB_1$) in both x and y dimensions was used. This assumption is based on the ZPU 104 unlikely being at large angles away from the trust beacons in normal uses. The user height, that is the distance above the ground in which the ZPU 104 sits, is assumed fixed for all results at 1.654 m which is an approximate average human height.

Figure 13A:
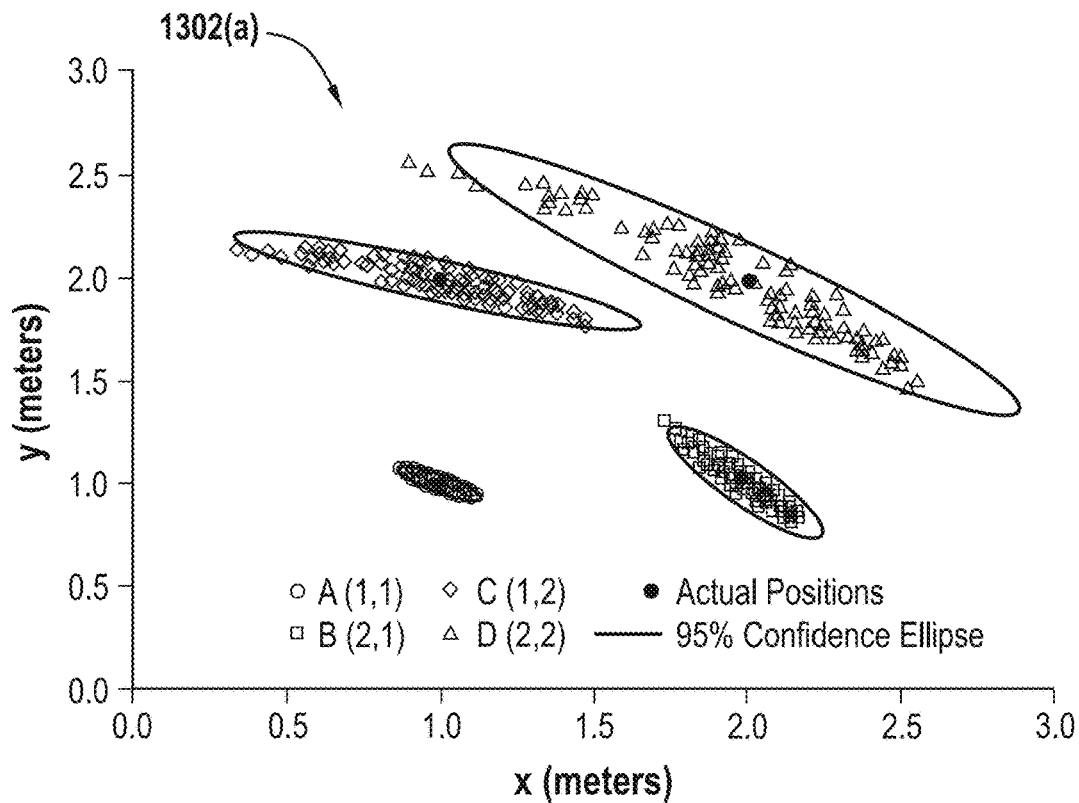
Figure 13B:
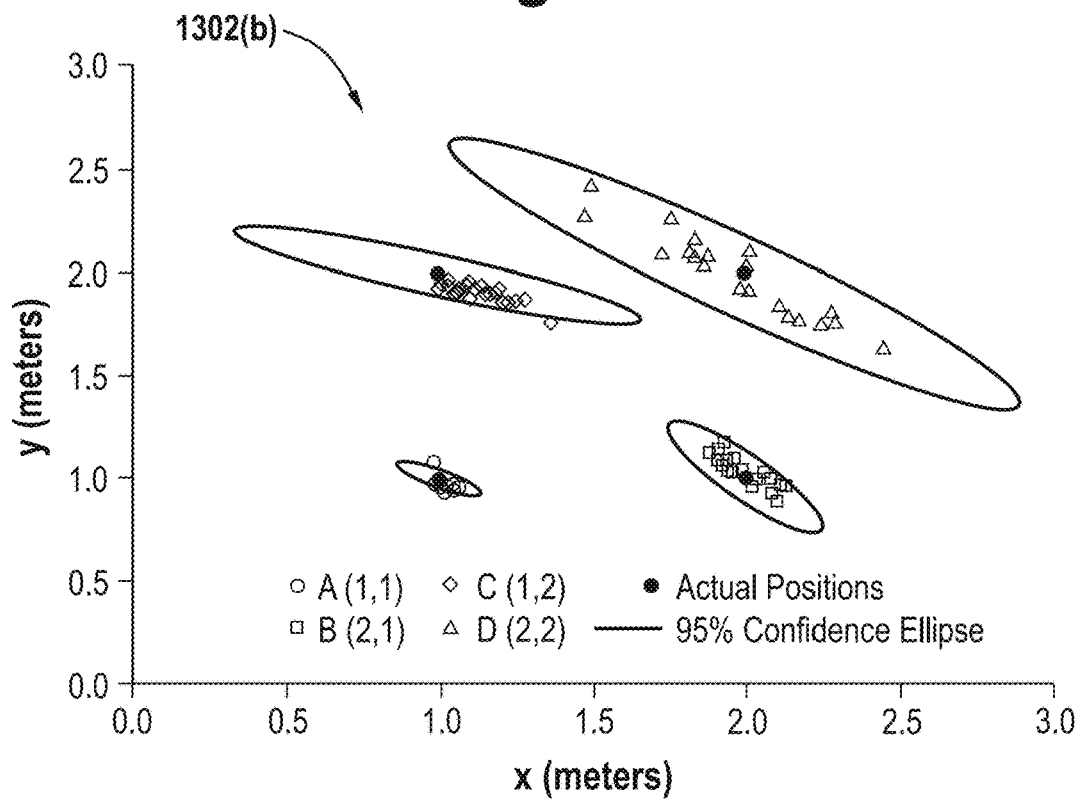

FIGS. 13A-13B show two-dimension performance: predicted in graph 1302(a) with experimental performance in graph 1302(b), where graphs 1302(a-b) depicts 95% confidence ellipses. Results are shown using data collected from the commercial off-the-shelf system components at four different locations: A (1, 1)m; B (2, 1)m; C (1, 2)m; and D (2, 2).

Figure 14A:
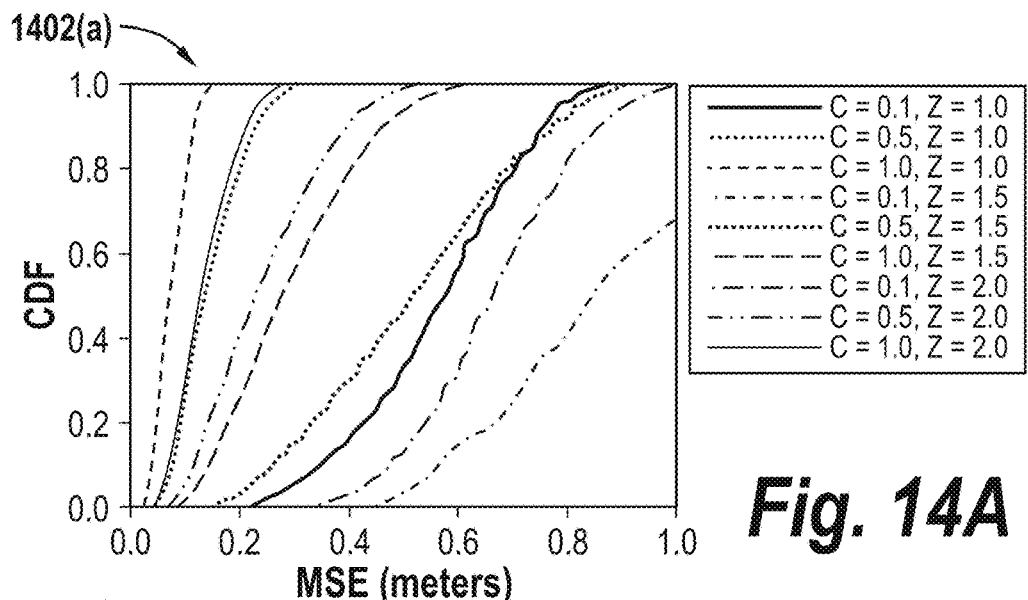

FIG. 14A depicts a graph 1402(a) exploring estimated position estimates as a cumulative distribution function (CDF) of the mean square error (MSE) for different trust beacon placement heights and also the lateral displacement C between the trust beacons across the entire test space under the baseline parameters. A small C distance results in weaker performance regardless of height. The best performance is when the trust beacon is placed at 1 m, and a difference of 0.654 m away from the user, which illustrates that placing the trust beacons at a plane not close to human height is ideal. This effect is due to angle measurements having, smaller effect on large angle deviations.

Figure 14B:
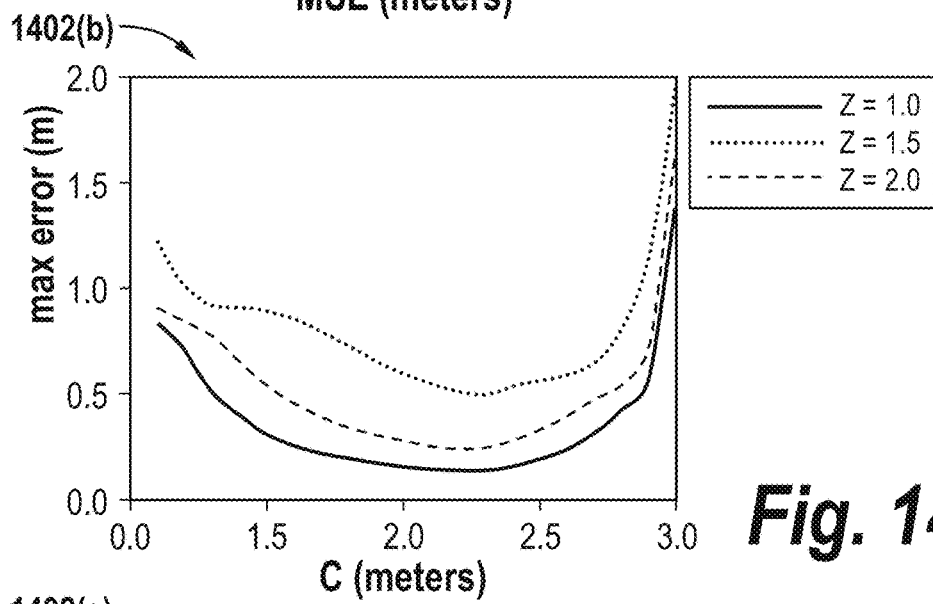

FIG. 14B depicts a graph 1402(b) showing different values of C and the maximum error in the test space at different trust beacon heights. Along with proving that a large height difference results in the best performance as concluded with graph 1402(a), graph 1402(b) shows the optimal C displacement for a given trust beacon heigh. For around 0.5 m to 1.5 m displacement, the results are similar with no significant improvement. Placing trust beacons between 0.5 m to 1.5 m away from each other is thus ideal.

Figure 14C:
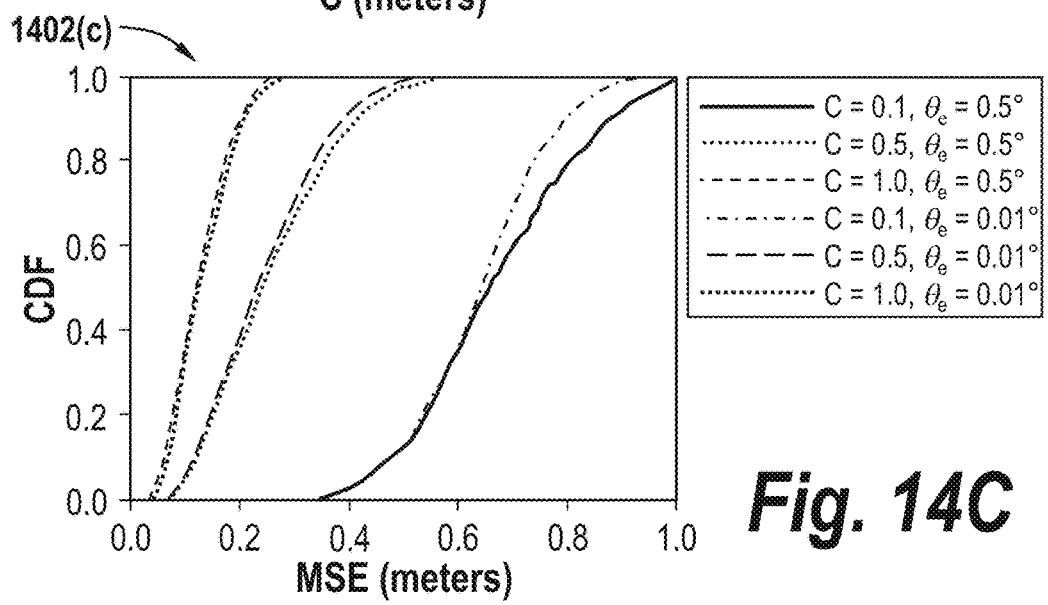

FIG. 14C depicts a graph 1402(c) showing the difference in finer quality steering when introducing MEMS steering in the yaw axis. The MEMS steering does reduce position estimate errors. MEMS steering is desirable for certain use cases as the MEMS actuators provide faster convergence in the form of fast steering speed and large field-of-view—a MEMS mirror scan module (Mirrorcle Technologies, Inc. Richmond, Calif.) has a scan rate of 1 Khz and a field-of-view of 40° which is relevant for mobile devices and use cases requiring fast acquisition of trust beacons with less user input. MEMS steering can be used for pitch as well. Decreasing the noise on both pitch and yaw will likely result in performance gains.

Figure 15A:
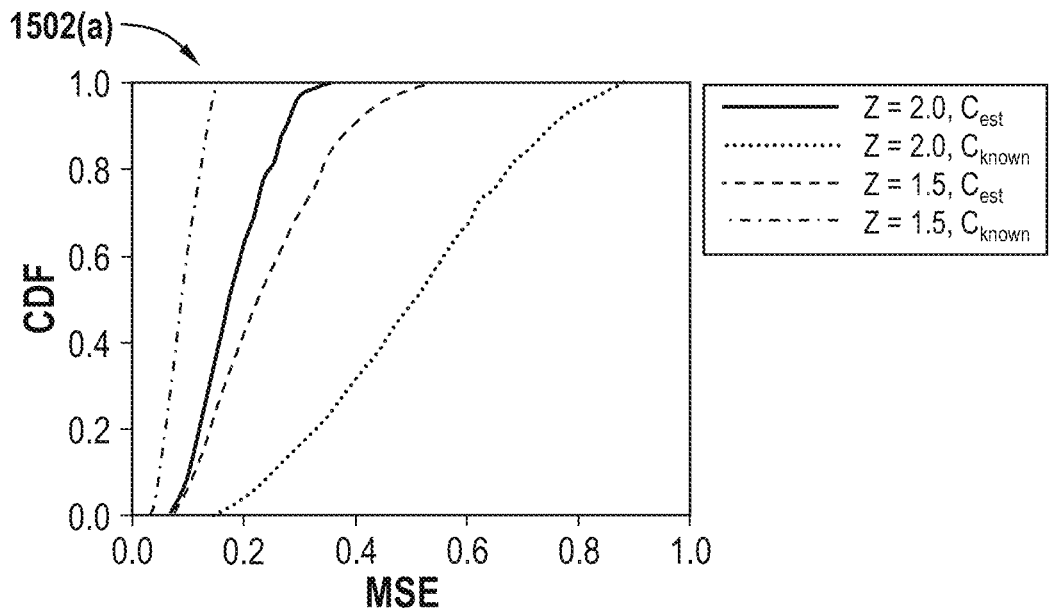

FIG. 15A depicts a graph 1502(a) showing the difference when using a known trust beacon displacement, C, versus an estimated (est.) displacement, $\hat{C}$. Each of C and $\hat{C}$ perform well depending on height. There is no fast holding rule to follow on whether a known or estimated displacement should be used as it is dependent on trust beacon location. Trust beacon location is known to the user-device when estimating. In the case of uncertainty, $\hat{C}$ will always ensure an estimate can be made and is the better choice for displacement.

Figure 15B:
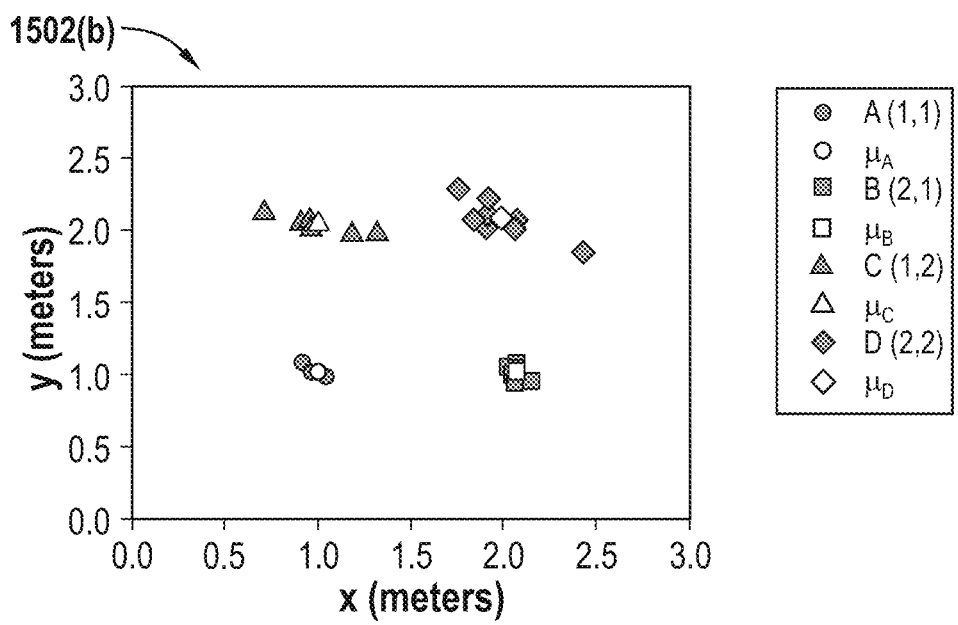

FIG. 15B depicts a graph 1502(b) showing results using data collected from the experimental, commercial, off-the-shelf configuration at four different ZPU 104 locations: A (1, 1)m; B (2, 1)m; C (1, 2)m; and D (2, 2) and a user height of 1.535 m. The trust beacons were placed respectively at (0,0,2)m and (0,0.5,2)m. A small angle approximation was used as the laser is placed adjacent to the Bose Frames reference axes. Experimental results show that accuracies are location dependent, as expected, and consistent with simulations. For locations A and B, the MSE was less than 15 cm. However, for locations C and D, errors are larger. Each test point, $\mu_A$, $\mu_B$, $\mu_C$, and $\mu_D$ was found to have an MSE of less than 15 cm.

Figure 16:
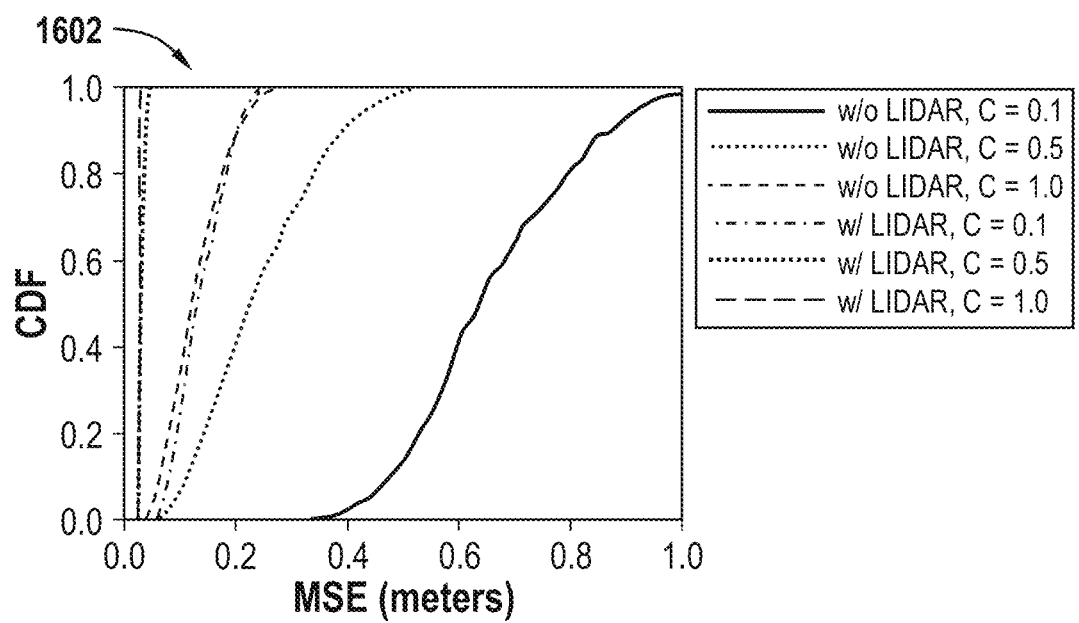
FIG. 16 depicts a graph showing position accuracies for three-dimensional positioning.
Figure 17A:
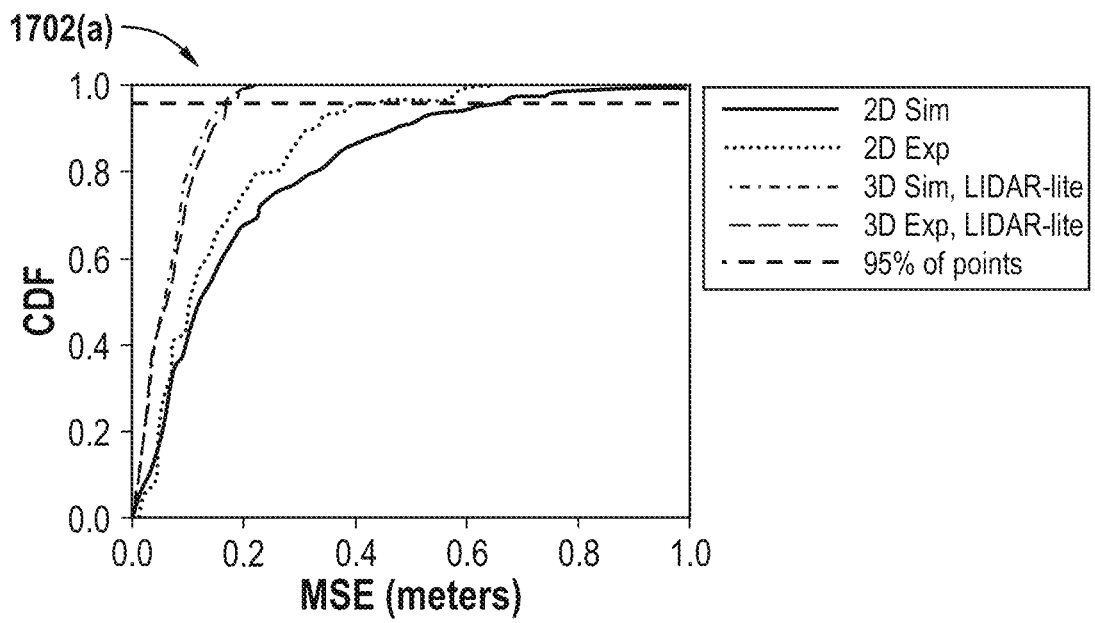
FIGS. 17A-17B depict graphs showing position accuracies in simulated and experimental models with and without the use of ranging.
Figure 17B:
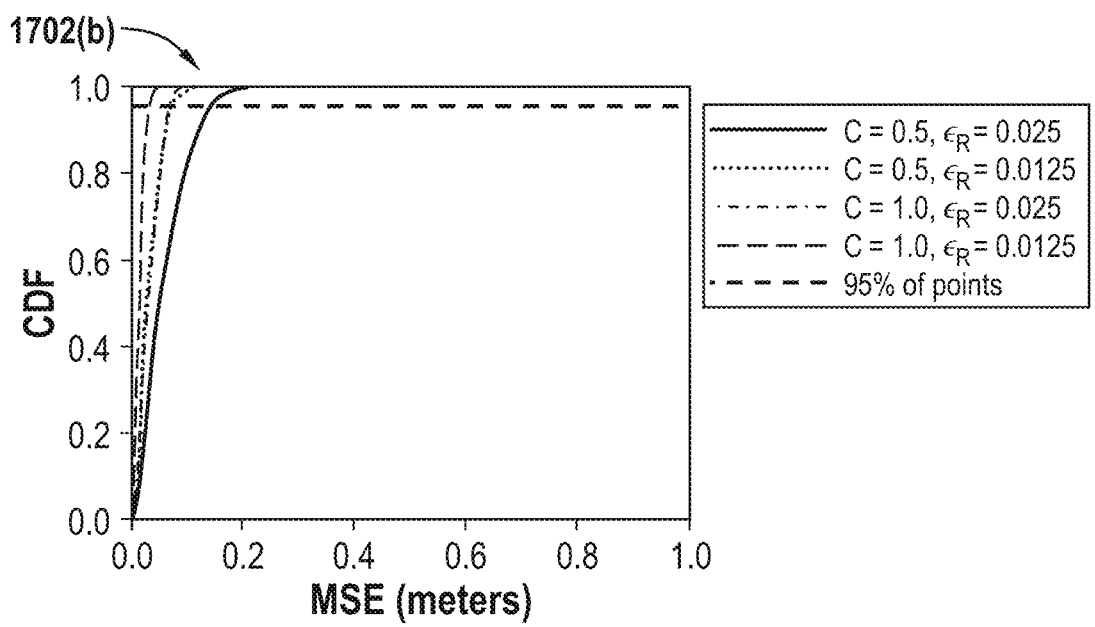

FIG. 16 depicts a graph 1602 showing position accuracies of less than 5 cm under the baseline condition for three-dimensional positioning, an improvement over the 20 cm accuracy for two-dimensional positioning. Factoring in range from LIDAR greatly increased the positioning accuracy even though additional costs are introduced to the positioning system. This is because LIDAR is a high accuracy methodology and provides better estimates for radial distances than estimating based on the IMU 204 measurements. This accuracy can be further improved with better ranging devices, as a consumer grade LIDAR device was used here. This makes the ZPU 104 a device that can be designed at different cost points. For coarser resolutions or inexpensive devices, the ranging sensor can be lower quality than the LIDAR device used herein as a baseline. Since two-dimensional positioning is a special case of three-dimensional positioning with a known height parameter, a range sensor-based solution can also be used for better resolutions in two-dimensional applications. Similarly, FIG. 17 depicts graph 1702(a) showing position accuracies of 20 cm in simulated and experimental models without the use of ranging, and position accuracies of 5 cm with the use of ranging, while graph 1702(b) shows position accuracies of less than 5 cm with a more precise zone-base positioning system.

Figure 18A:
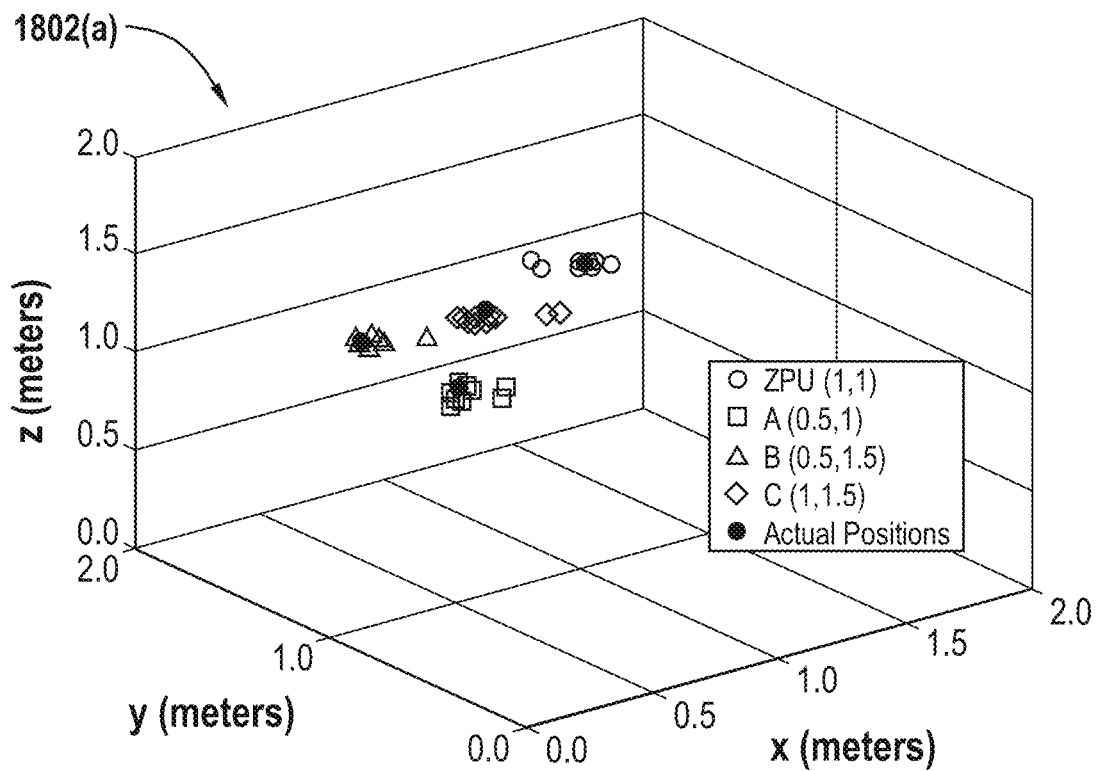
FIGS. 18A-18B depict graphs showing transitive positioning errors in simulated and experimental models.
Figure 18B:
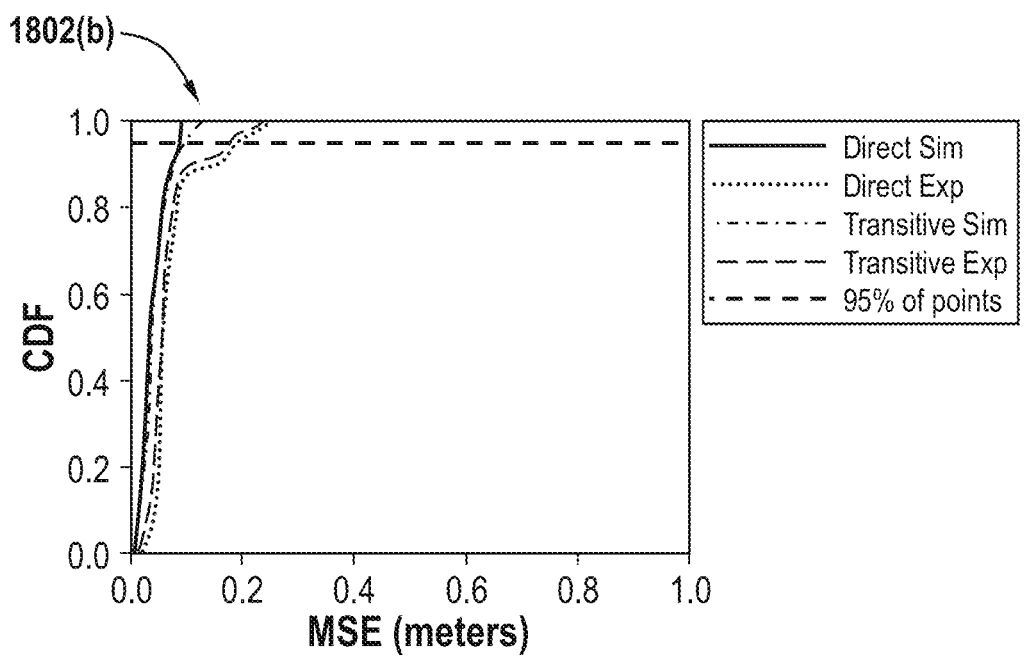
Figure 19A:
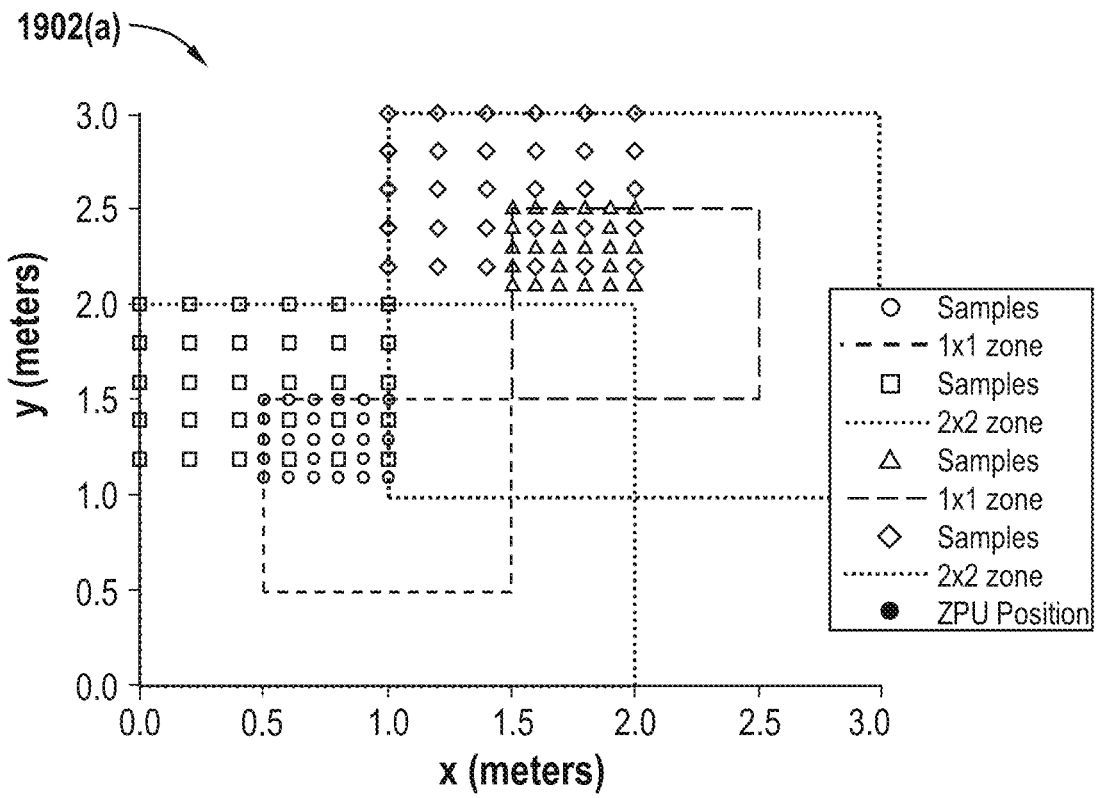
FIGS. 19A-19B depict graphs showing the impact of different transitive zone sizes.
Figure 19B:
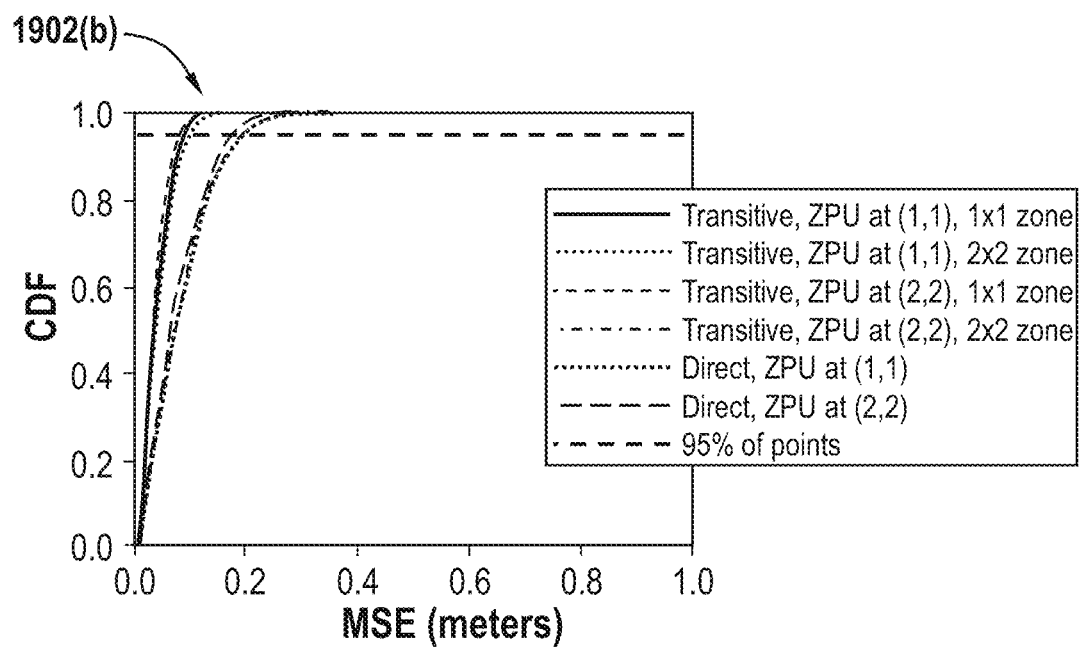

FIG. 18A-18B depict graphs 1802(a) and 1802(b) showing transitive positioning errors in a simulated and experimental context as explained with reference to the two-dimensional and three-dimensional cases. No new error rate is introduced in the transitive positioning application. Similarly, FIG. 19A-19B depicts graphs 1902(a) and 1902(b) showing the impact of different transitive zone sizes. No new error rate is introduced in this context either.

The subject technology enables mobility use cases in indoor positioning environments, similar to what is provided by global navigation satellite systems (GNSS) services outdoors. These use cases include navigation through public spaces such as malls, warehouses, and hospitals, but also spans position-based marketing, object labeling for augmented reality, and physical control of remote objects. Zone-based positioning enables position estimating of objects within a field of view of a user device or robot, after positioning the user device or robot relative a trust beacon. Zone-based positioning is a scalable approach using low cost components and accuracy on the order of 10 centimeters or less as measured in three-dimensional mean square error.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A zone-based positioning system comprising:
a first beacon positioned at a known position within an environment at a given time, the first beacon having:
   a beacon optical detector configured to receive an optical signal; and
   a beacon microcontroller, the beacon microcontroller capable of wireless communication, the beacon microcontroller configured to demodulate the optical signal from the optical detector; and
a zone positioning unit (ZPU) having:
   an optical source configured to transmit the optical signal, and use optical communication to communicate with the first beacon via the beacon optical detector; and
   a ZPU microcontroller capable of wireless communication, the ZPU microcontroller configured to modulate the optical source,
wherein:
   the beacon microcontroller is configured to identify and decode the optical signal after receipt by the beacon optical detector to determine data related to a position of the ZPU, the data including an orientation of the ZPU, the beacon microcontroller further configured to wirelessly communicate with the ZPU microcontroller to convey information to the ZPU including the data related to a position of the ZPU and the known position of the first beacon; and
   the ZPU microcontroller is configured to determine a position of the ZPU based on the information received from the first beacon.

2. The zone-based positioning system of claim 1, wherein the ZPU further comprises a steerable system to direct the optical source to scan the environment for the first beacon as an optical target, the system including one or more of the following: micro-electromechanical system, electro-optical system, holographic system, or plasmonics system.

3. The zone-based positioning system of claim 1, wherein the ZPU further comprises a gaze-tracking system, the gaze-tracking system configured to track an eye position of a user and direct the optical source based on the eye position of the user.

4. The zone-based positioning system of claim 1, wherein the ZPU further comprises an inertial measurement unit to measure an orientation of the ZPU.

5. The zone-based positioning system of claim 1, wherein the ZPU further comprises a range sensor configured to measure a range from the ZPU to one or more of the following: the first beacon; a second beacon; or an object.

6. The zone-based positioning system of claim 5, wherein the range sensor includes one or more of the following: light and radio frequency ranging via radio signal strength, ultra-wideband signals, millimeter wave, radio frequency, RADAR, time of flight, rotating laser, images, or LIDAR.

7. The zone-based positioning system of claim 5, further comprising an object positioned within the environment, wherein:
   the ZPU is configured to transmit the optical signal to the object to determine an orientation of the ZPU relative the object;
   the ZPU is configured to measure the range between the ZPU and the object; and
   the ZPU is configured to determine a position of the object based on the orientation of the ZPU and the range between the ZPU and the object.

8. The zone-based positioning system of claim 1, further comprising a transitive device positioned within the environment, wherein:
   the transitive device includes a transitive device optical detector configured to detect the optical signal; and
   a transitive device microcontroller capable of wireless communication, the transitive device microcontroller configured to:
   identify and decode the optical signal after receipt by the transitive device optical detector to an orientation of the ZPU relative the transitive device; and
   wirelessly communicate with the ZPU to convey data the orientation of the ZPU relative the transitive device.

9. The zone-based positioning of claim 1, wherein the optical signal is modulated by the ZPU microcontroller to include data related to a position of the ZPU, the data including real-time orientation measurements of the ZPU.

10. The zone-based positioning system of claim 1, further comprising a second beacon positioned at a second known position within the environment, the second beacon having:
   a second beacon optical detector configured to detect the optical signal; and
   a second beacon microcontroller, the second beacon microcontroller capable of wireless communication,
wherein:
   the second beacon microcontroller is configured to identify and decode the optical signal after receipt by the second beacon optical detector to determine data related to an orientation of the ZPU, the second beacon microcontroller further configured to wirelessly communicate with the ZPU microcontroller to convey information including the data related to a position of the ZPU and the known position of the second beacon to the ZPU; and
   the ZPU microcontroller is configured to determine a position of the ZPU based additionally on the information received from the second beacon.

11. The zone-based positioning system of claim 1, further comprising a plurality of beacons positioned at a plurality of known positions within the environment.

12. A zone-based positioning system comprising:
a first beacon positioned at a known position within an environment; and
a zone positioning unit (ZPU) having:
   an optical source configured to transmit an optical signal to the first beacon;
   a range sensor configured to measure a range from the ZPU to the first beacon; and
   a ZPU microcontroller configured to identify the position of the first beacon based on the optical signal,
wherein:
   the ZPU microcontroller is further configured to compute a position of the ZPU based on the range measurement from the ZPU to the first beacon, a transmission angle of the optical signal to the first beacon, and the position of the first beacon.

13. The zone-based positioning system of claim 12, wherein the first beacon further comprises an identifiable optical signature, and
wherein the ZPU microcontroller is configured to detect the identifiable optical signature based on the optical signal, and the ZPU microcontroller is configured to determine the position of the first beacon based on the identifiable optical signature and a database.

14. A method of zone-based positioning comprising:
providing a first beacon at a known position within an environment, the first beacon having a beacon detector configured to receive a signal, the first beacon also having a beacon microcontroller capable of wireless communication;

providing a zone positioning unit (ZPU), the ZPU having a signal transmission device, the ZPU also having a ZPU microcontroller capable of wireless communication, the ZPU microcontroller configured to modulate the signal transmission device;

directing a modulated signal from the ZPU;

decoding the modulated signal after receipt by the beacon detector to determine data related to a position of the ZPU, the data including an orientation of the ZPU;

wirelessly communicating information from the beacon microcontroller to the ZPU including the data related to a position of the ZPU and the known position of the first beacon; and determining a position of the ZPU based on the information received from the first beacon.

15. The method of claim 14, wherein:
the beacon detector is a beacon acoustic detector configured to receive an acoustic signal; and
the signal transmission device is an acoustic source configured to transmit the acoustic signal.

16. The method of claim 14, wherein:
the beacon detector is a radio frequency (RF) signal detector configured to receive a RF signal; and
the signal transmission device is a RF source configured to transmit the RF signal.

17. The method of claim 14, further comprising measuring a range using a range sensor on the ZPU, the range including a distance from the ZPU to one or more of the following: the first beacon; a second beacon; or an object.

18. The method of claim 14, further comprising:
directing a modulated signal from the ZPU to an object to determine data related to the ZPU position, the data including an orientation of the ZPU;
measuring the range between the ZPU and the object using a range sensor on the ZPU; and
computing a position of the object based on the data related to the ZPU position and the range between the ZPU and the object.

19. The method of claim 14, further comprising:
providing a second beacon at a second known position within the environment, the second beacon having a second beacon detector configured to receive a signal, the second beacon also having a second beacon microcontroller capable of wireless communication;
decoding the modulated signal after receipt by the second beacon detector to determine data related to a position of the ZPU, the data including an orientation of the ZPU;
wirelessly communicating information from the second beacon microcontroller to the ZPU including the data related to a position of the ZPU and the known position of the second beacon;
and determining a position of the ZPU based additionally on information received from the second beacon.

20. The method of claim 14, further comprising providing a plurality of beacons positioned at a plurality of known positions within the environment.

* * * * *